US000001127H

United States Statutory Invention Registration [19]

[11] Reg. Number: H1127

Shimazaki et al.

[43] Published: Jan. 5, 1993

[54] SILVER HALIDE PHOTOGRAPHIC MATERIAL

[75] Inventors: Hiroshi Shimazaki; Fumie Fukazawa; Masayuki Kurematsu; Kenjiro Ushiyama; Satoru Shimba, all of Hino, Japan

[73] Assignee: Konica Corporation, Japan

[21] Appl. No.: 593,496

[22] Filed: Oct. 3, 1990

Related U.S. Application Data

[63] Continuation of Ser. No. 236,512, Aug. 24, 1988, abandoned.

[30] Foreign Application Priority Data

Aug. 31, 1987 [JP] Japan ..... 62-218257
Feb. 19, 1988 [JP] Japan ..... 63-37904

[51] Int. Cl.[5] ..... G03C 7/32
[52] U.S. Cl. ..... 430/545; 430/496; 430/543; 430/537; 430/551; 430/565; 430/567; 430/609; 430/630
[58] Field of Search ..... 430/609, 630, 543, 545, 430/537, 551, 496, 565, 567

[56] References Cited

U.S. PATENT DOCUMENTS

| | | | |
|---|---|---|---|
| 2,495,918 | 1/1950 | Bolton | 430/630 |
| 3,021,213 | 2/1962 | Dersch et al. | 430/609 |
| 3,060,028 | 10/1962 | Dersch | 430/609 |
| 3,342,592 | 9/1967 | Chu et al. | 96/22 |
| 3,505,067 | 4/1970 | Dersch et al. | 430/609 |
| 3,518,086 | 6/1970 | Millard | 430/609 |
| 3,770,450 | 11/1973 | Kawano et al. | 430/630 |
| 4,045,226 | 8/1977 | Hara et al. | 430/630 |
| 4,120,725 | 10/1978 | Nakazyo et al. | 430/630 |
| 4,431,730 | 2/1984 | Urabe et al. | 430/630 |
| 4,818,667 | 4/1989 | Hamada et al. | 430/543 |
| 4,833,069 | 5/1989 | Hamada et al. | 430/543 |
| 4,916,053 | 4/1990 | Ohshima et al. | 430/630 |

FOREIGN PATENT DOCUMENTS

| | | | |
|---|---|---|---|
| 0001621 | 1/1979 | Japan | 430/630 |
| 1070688 | 6/1967 | United Kingdom | 430/630 |

OTHER PUBLICATIONS

*Chem. Abstr.* No. 90:213193k, 1979.

*Primary Examiner*—Robert L. Stoll
*Assistant Examiner*—Joseph D. Anthony
*Attorney, Agent, or Firm*—Bierman and Muserlian

[57] ABSTRACT

A silver halide photographic material that contains a polymer including a repeating unit represented by the following general formula (I) and having a weight average molecular weight of no more than 30,000:

(I)

wherein $R^1$ is a hydrogen atom or an alkyl group; Z represents the atomic group necessary to form a lactam ring, an oxazolidone ring or a pyrrolidone ring; A is a simple linkage, —CO—, —COO$(CH_2)_n$— or —CONR$^2(CH_2)_n$— where $R^2$ is a hydrogen atom or an alkyl group, and n is an integer of 1–6. This photographic material experiences a minimum level of increase in fogging during rapid processing and produces image having improved sharpness and granularity.

22 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE PHOTOGRAPHIC MATERIAL

This application is a continuation of application Ser. No. 07/236,512, filed Aug. 24, 1988, now abandoned.

BACKGROUND OF THE INVENTION

The present invention relates to a silver halide photographic material. More particularly, the present invention relates to a silver halide color photographic material that is adapted for rapid processing without experiencing increased fogging and which is capable of producing an image having improved sharpness and granularity.

With the recent tendency in the photographic industry toward adoption of smaller formats of silver halide color photographic materials (hereinafter referred to simply as color light-sensitive materials), there has been an increasing need for attaining high image quality in terms of such aspects as granularity and sharpness on the one hand, and for realizing rapid processing on the other hand. Color light-sensitive materials are normally processed on a running basis with automatic developers that are installed at photofinishing laboratories. However, the desire of users for having their pictures developed as soon as possible is constantly growing and most modern laboratories have facilities for developing negative films and returning the developed films to users on the day they received the negatives. Some laboratories are even capable of returning the finished films within several hours from the time they were received.

Various studies have been conducted to realize rapid photographic processing. With a view to shortening the duration of a color development step, it has been proposed that the concentration of a color developing agent should be increased, or the pH of a color developer be increased, or the temperature of the color developer be increased. An attempt has also been made to reduce the overall thickness of photographic constituent layers in order to improve the permeability of processing solutions and to provide better sharpness. However, these methods suffer the disadvantage that they cause a noticeable increase in fogging and, in particular, if they are applied to color negatives of high sensitivity, they cause various problems including prolonged print time subsequent to photographic processing, loss of color balance, and deterioration of granularity.

SUMMARY OF THE INVENTION

An object, therefore, of the present invention is to provide a silver halide photographic material that is protected against fogging and which is adapted for rapid processing, in particular, for rapid color development while experiencing a minimal level of increase in fogging.

Another object of the present invention is to provide a silver halide photographic material that is capable of producing image having improved sharpness and granularity.

These objects of the present invention can be attained by a silver halide photographic material that contains a polymer including a repeating unit represented by the following general formula (1) and having a weight average molecular weight of no more than 30,000:

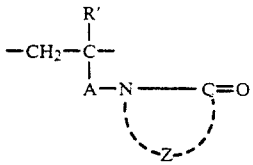

(I)

where $R^1$ is a hydrogen atom or an alkyl group; Z represents the atomic group necessary to form a lactam ring, an oxazolidone ring or a pyrrolidone ring; A is a simple linkage, —CO—, —COO( $CH_2)_2$ or —$CONR^2(CH_2)_n$ where $R^2$ is a hydrogen atom or an alkyl group, and n is an integer of 1–6.

DETAILED DESCRIPTION OF THE INVENTION

Polymers including a repeating unit represented by the general formula (I) have conventionally been used as substitutes for binders such as gelatin. Japanese Patent Application (OPI) No. 136641/1982 (the term OPI as used herein means an unexamined published Japanese Patent Application) discloses a technique for increasing the reversal sensitivity of an internal latent image forming direct positive emulsion by chemically sensitizing the surface of emulsion grains in the presence of said polymers. Japanese Patent Publication No. 51259/1972 discloses the use of these polymers in combination with a hydroxyl containing black-and-white developing agent (or derivative thereof) so as to improve the granularity of a color light-sensitive material of interest while inhibiting the occurrence of color fogging.

However, most of the polymers employed in these prior art techniques range from several tens to hundreds of thousand in weight average molecular weight and it was entirely unexpected that polymers as defined herein and which have weight average molecular weights of no more than 30,000 would be capable of attaining the above-described effects peculiar to the present invention.

The polymer including a repeating unit represented by the general formula (I) and which is to be used in the present invention (this polymer is hereinafter referred to as the polymer of the present invention) has a weight average molecular weight of no more than 30,000, preferably no more than 20,000, with 10,000 or below being particularly preferred. The weight average molecular weight of the polymer of the present invention is a polyethylene glycol adjusted value as determined from the curve constructed by performing GPC (gel permeation chromatography) using TSK-GEL Toyopal (Tosoh Corp.) as a column packing material.

The intended effect of the present invention can be attained by using the polymer of the present invention in smaller amounts that are necessary when it is used as a protective colloid or a binder. Normally, the polymer is used in an amount of 0.01–10 g per mole of silver in terms of the weight of the repeating unit (I) in the polymer, and the range of 0.02–5.0 g is preferred, with the range of 0.1–2.0 g being particularly preferred.

Besides the polymer of the present invention which has a weight average molecular weight of no more than 30,000, the silver halide photographic material of the present invention may contain polymers of higher molecular weights that are outside the scope of the present invention, and the inclusion of such additional polymers will do no harm to the objective of the present invention.

The polymer of the present invention is described below in greater detail. This polymer has a repeating unit represented by the general formula (I). A preferred example of this repeating unit is such that $R^1$ is a hydrogen atom, A is a simple linkage or

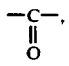

and Z represents the atomic group necessary to form a five- or six-membered lactam or oxazolidone ring. A particularly preferred case is where

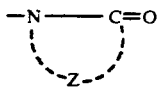

represents a pyrrolidone or oxazolidone residue, and the most preferred case is where said group is a pyrrolidone residue.

The polymer having a repeating unit represented by the general formula (I) may be a homopolymer or a copolymer. In other words, this polymer may be a homopolymer of a monomer represented by the general formula (I), or a copolymer of two or more monomers represented by the general formula (I), or a polymer prepared by copolymerizing one or more of such monomers with an addition-polymerizable ethylenically unsaturated compound.

Examples of the addition-polymerizable ethylenically unsaturated compound that is capable of forming a copolymer together with the monomer of the general formula (I) include: acrylate esters, methacrylate esters, acrylamides, methacrylamides, allyl compounds, vinyl ethers, vinyl esters, vinyl heterocyclic compounds, styrenes, maleate esters, fumarate esters, itaconate esters, crotonate esters and olefins. From the viewpoint of the hydrophilicity of the polymers produced, the following comonomers are preferred: acrylic acid, methacrylic acid, 2-hydroxyethyl acrylate, 2-methoxyethyl acrylate, sulfopropyl acrylate, acrylamide, dimethyl acrylamide, 2-acryloylamino-2-methylpropanesulfonic acid, hydroxyethyl acrylamide, methacrylamide, methyl vinyl ether, sodium styrenesulfonate, N-vinyl-3,5-dimethyltriazole, and maleic anhydride.

The compositional range of the polymer containing a repeating unit represented by the general formula (I) is not limited in any particular way but preferably the component represented by the general formula (I) accounts for 10–100 mol %, more preferably 50–100 mol %, of the polymer.

Homopolymers or copolymers having a repeating unit represented by the general formula (I) may be synthesized by known methods such as those described in British Patent Nos. 961,395, 1,211,039, Japanese Patent Publication No. 29195/1972, Japanese Patent Application (OPI) Nos. 76593/1973, 92022/1973, 21134/1974, 120634/1974, U.S. Pat. Nos. 3,227,672, 3,290,417, 3,262,919, 3,245,932, 2,681,897, 3,230,275, John C. Petropoulos et al., Official Digest, 33, pp. 719–736 (1961), and "Gosei Kobunshi (Synthetic Polymers)", ed. by S. Murahashi, Vol. 1, pp. 246–290, and vol. 3, pp. 1–108.

Typical examples of the polymer of the present invention are listed below:

(1) Poly(N-vinylpyrrolidone)
(2) Poly(N-vinyloxazolidone)
(3) Poly(N-vinylpiperidone)
(4) Poly(N-vinyl-ε-caprolactam)
(5) Vinyl alcohol/N-vinylpyrrolidone copolymer (molar ratio, 20:80)
(6) N-Vinylpyrrolidone/vinyl acetate copolymer (molar ratio, 70:30)
(7) N-Vinylpyrrolidone/2-hydroxyethyl acrylate copolymer (molar ratio, 70:30)
(8) N-Vinylpyrrolidone/acrylic acid copolymer molar ratio, 90:10)
(9) N-Vinylpyrrolidone/N-vinyl-3,5-dimethyltriazole copolymer (molar ratio, 50:50)
(10) N-Vinyloxazolidone/vinyl alcohol copolymer (molar ratio, 65:35)
(11) N-Vinyloxazolidone/acrylic acid copolymer (molar ratio, 80:20)
(12) N-Vinylpyrrolidone/2-hydroxyethyl acrylate/vinyl acetate terpolymer (molar ratio, 70:20:10)
(13) N-Vinylpyrrolidone/vinyl alcohol/vinyl propionate/sodium styrenesulfonate copolymer (molar ratio, 40:40:5:15)
(14) N-Vinylpyrrolidone/acrylamide copolymer (molar ratio, 60:40)
(15) N-Vinylpyrrolidone/2-acrylamide/2-methylpropanesulfonic acid copolymer (molar ratio, 75:25)
(16) N-Vinyloxazolidone/N-(2-hydroxyethyl)acrylamide copolymer (molar ratio, 70:30)
(17) N-Vinylpyrrolidone/N-vinylmorpholine/acrylamide terpolymer (molar ratio, 50:20:30)
(18) N-Vinyloxazolidone/acrylamide/acrylic acid terpolymer (molar ratio, 60:20:20)
(19) N-Vinylpyrrolidone/acrylamide/vinyl acetate/acrylic acid copolymer (molar ratio, 60:20:10:10)
(20) N-Vinyl pyrrolidone/dimethyl acrylamide copolymer (molar ratio, 70:30).

These polymers may be incorporated in silver halide emulsion layers or in non-light-sensitive layers in the light-sensitive material of the present invention, and it is particularly preferable to incorporate them in silver halide emulsion layers.

These polymers may be incorporated in the light-sensitive material by standard methods which are employed for incorporating additives for photographic emulsions. For instance, the polymers may be added as solutions in suitable solvents (e.g., water, aqueous alkaline solutions or methanol) that will not cause any deleterious effects on the light-sensitive material as the final product. If the polymers are to be incorporated in emulsions, the time of addition may be prior to, or after or during chemical sensitization of silver halide. The polymers may be added to silver halide after they have been incorporated in dispersions of couplers, etc. prepared or under preparation. If desired, the polymers may be added to coating solutions while they are being prepared.

The light-sensitive silver halide emulsion used in the silver halide photographic material of the present invention may contain any of the silver halides that are used in ordinary silver halide emulsions, such as silver bromide, silver iodobromide, silver iodochloride, silver chlorobromide, silver chloroiodobromide and silver chloride. It is particularly preferable to employ silver iodobromide or silver chloroiodobromide containing at least 0.5 mol % of silver iodide.

The grains of these light-sensitive silver halides may have a uniform distribution in silver halide composition but they are preferably core/shell grains having different silver halide compositions in the interior and the surface layer. Detailed information about the core/shell type silver halide grains that are preferably used in the present invention may be found in Japanese Patent Application (OPI) No. 154232/1982. These grains have a core composed of a silver halide containing 0.1–40 mol %, preferably 5–40 mol %, most preferably 8–35 mol %, of silver iodide, with the shell being made of silver bromide, silver chloride, silver iodide, silver chlorobromide or a mixture thereof. These core/shell type silver halide grains have at least 0.5 mol % of silver iodide in their average silver halide composition.

Particularly desirable silver halide grains are those which have a shell containing at least 95 mol % of silver bromide. More specifically, silver halide grains containing silver iodide are used as cores and these cores are provided with a shell whose thickness is strictly controlled in such a way as to ensure that only the preferred characteristics of the cores are effectively exhibited while their unwanted behavior is masked. The method of coating the cores with a shell having the necessary and minimum absolute thickness for having them exhibit their nature in an effective way is highly advantageous in that it can be applied to other purposes including improvement in keeping quality or in the efficiency of sensitizing dye adsorption by changing the material of the core or the shell.

A silver halide emulsion containing core/shell type silver halide grains that are preferably used in the present invention may be prepared by coating a shell on the cores that are made of silver halide grains present in a monodispersed emulsion. Monodispersed core grains can be obtained in a desired size by performing the double-jet method with the pAg being held constant. A highly monodispersed silver halide emulsion can be prepared by the method described in Japanese Patent Application (OPI) No. 48521/1979. In a preferred case, an aqueous solution of potassium silver iodide and gelatin and an aqueous solution of ammoniacal silver nitrate are added to an aqueous gelatin solution containing silver halide seed grains, with the rate of their addition being changed as a function of time. By proper selection of factors including the time function of addition rate, pH, pAg and temperature, a desired highly monodisperse silver halide emulsion can be obtained.

The standard deviation of the grain size of a monodispersed emulsion can be readily determined since it provides an essentially normal grain size distribution. If the standard deviation is known, the percent spread of size distribution can be expressed by the following relation:

$$\frac{\text{standard deviation}}{\text{average grain size}} \times 100 = \text{spread of distribution (\%)}$$

In order to ensure that the absolute thickness of a shell coating can be effectively controlled, the core grains preferably have a monodispersity of no more than 20% in terms of the spread of grain size distribution as defined above, with 10% or less spread being more preferred.

As already mentioned, the shell coating to be formed on the core grains should not be thick enough to mask the preferred characteristics of the core but on the other hand, it must be thick enough to mask any unwanted nature of the core. The thickness of the shell coating is preferably within a narrow range that is defined by these upper and lower limits. A shell coating that satisfies this requirement can be deposited on monodispersed core grains by performing the double-jet method using a solution of a soluble halide compound and a solution of a soluble silver salt. If the shell coating formed is too thin, the silver iodide-containing substrate of the core will become exposed in several areas and the effects to be attained by coating a shell on the core grains, including chemical sensitization, rapid developability and fixability, will not be obtained. The preferred lower limit of shell thickness is 0.01 μm. With highly monodispersed core grains having a distribution spread of no more than 10%, a preferred shell thickness is in the range of 0.01–0.4 μm, and the most preferred range is from 0.01 to 0.2 μm.

Emulsions containing these silver halide grains may additionally contain antifoggants and stabilizers. The use of mercapto group containing heterocyclic compounds or hydroxypolyazaindenes is particularly effective.

Silver halide emulsions may be chemically sensitized with suitable sensitizers including activated gelatin, sulfur sensitizers, selenium sensitizers, reduction sensitizers and noble metal sensitizers. If desired, the emulsions may be spectrally sensitized by addition of suitable sensitizing dyes in order to impart sensitivity in desired wavelength ranges of sensitivity.

The concept of the present invention is advantageously applied to a silver halide color photographic material having photographic constituent layers including a blue-sensitive, a green-sensitive and a red-sensitive emulsion layer on a support. In such a silver halide color photographic material, the total thickness of the photographic constituent layers on a dry basis is preferably not more than 18 μm, with the lower limit being determined by the type of silver halide emulsions, couplers, oils and other commonly employed additives. More preferably, the total thickness of the photographic constituent layers is in the range of 5–18 μm, with the range of 10–16 μm being most preferred. The thickness of layers as measured from the top surface of the light-sensitive material to the bottom of the silver halide emulsion layer situated the closest to the support is preferably not more than 14 μm. More preferably, the thickness as measured to the bottom of a silver halide emulsion layer that has sensitivity to a different color of light than said bottommost emulsion layer and which is situated the second closest to the support is not greater than 10 μm.

The overall thickness of the color light-sensitive material of the present invention may be reduced by using a smaller amount of a hydrophilic colloid serving as a binder. The amount of the hydrophilic colloid used can be decreased subject to the condition that the various purposes of its addition will not be impaired including the retention of silver halides and tiny oil globules such as couplers in high-boiling point solvents, the prevention of increase in fog due to mechanical stresses, and the prevention of color mixing due to the diffusion between layers of the oxidation product of a developing agent.

Another method that can be employed to reduce the overall thickness of the color-light sensitive material of the present invention is to use couplers capable of efficient color formation.

Other methods that are capable of reducing the overall thickness of the color light-sensitive material of the present invention include 1) using a decreased amount of a high-boiling point solvent and 2) reducing the thickness of intermediate layers between emulsion layers sensitive to different colors of light by incorporating a scavenger for the oxidation product of a developing agent in these intermediate layers.

The light-sensitive material of the present invention having the composition described above may be a color negative or positive film or a color paper. The intended effect of the present invention will be fully exhibited when it is applied to a picture-taking color negative film.

The silver halide photographic materials of the present invention which are illustrated by color films are principally intended for use in multi-color silver halide photography involving color reproduction by the substractive process. Typically, they comprise silver halide emulsion layers and non-light-sensitive layers disposed in superposition on a support. The silver halide emulsion layers contain magenta, yellow and cyan photographic couplers. The number of the photographic constituent layers and the order in which they are arranged are in no way limited and may be suitably modified in accordance with the intended performance and object of the finally prepared light-sensitive material. Any known photographic couplers may be employed but from the viewpoint of the color forming ability of couplers and the color reproduction of color-forming dyes, the use of benzoyl-type yellow, couplers, pyrazoloazole-type magenta couplers, as well as naphtholic or ureidophenolic cyan couplers is preferred.

Preferred benzoyl-type yellow couplers are the compounds that are represented by the following general formula (YB-I):

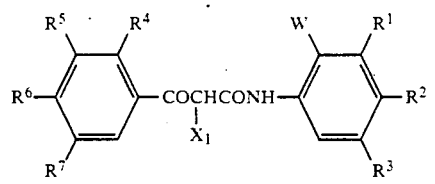

(YB-I)

where $R^1$, $R^2$ and $R^3$ which may be the same or different each represents a hydrogen atom, a halogen atom, an alkyl group, an aryl group, an alkoxy group, an acylamino group, a carbamoyl group, an alkoxycarbonyl group, a sulfonamido group or a sulfamoyl group; $R^4$, $R^5$, $R^6$ and $R^7$ which may be the same or different each represents a hydrogen atom, an alkyl group, an alkoxy group, an aryloxy group, an acylamino group or a sulfonamido group; W is a halogen atom, an alkyl group, an alkoxy group, an aryloxy group or a dialkylamino group; and $X_1$ is a hydrogen atom or a group that can be eliminated. Such a leaving group is preferably represented by the following general formula (YB-II):

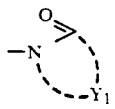

(YB-II)

where $Y_1$ denotes the non-metallic group necessary for forming a 5- or 6-membered ring.

The following are non-limiting examples of benzoyl-type yellow couplers.

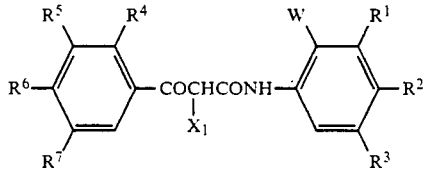

| Compound Example No. | $R^1$ | $R^2$ | $R^3$ | $R^4$ | $R^5$ | $R^6$ | $R^7$ | W | $X_1$ |
|---|---|---|---|---|---|---|---|---|---|
| YB-1 | —H | —H | (7) | —H | —H | (4) | —H | (1) | (16) |
| YB-2 | —H | —H | (7) | —H | —H | (4) | —H | (1) | (17) |
| YB-3 | —H | —H | (8) | —H | —H | —H | —H | (1) | (18) |
| YB-4 | —H | —H | (8) | —H | —H | —H | —H | (4) | (19) |
| YB-5 | —H | —H | (6) | (2) | —H | —H | —H | (4) | (20) |
| YB-6 | —H | —H | (9) | —H | —H | (4) | —H | (1) | (21) |
| YB-7 | —H | —H | (11) | —H | (10) | (4) | —H | (4) | (22) |
| YB-8 | —H | —H | —H | —H | —H | —H | (7) | (4) | (23) |
| YB-9 | —H | —H | (12) | —H | —H | (4) | —H | (1) | (24) |
| YB-10 | —H | —H | (13) | —H | —H | —H | —H | (1) | (25) |
| YB-11 | —H | —H | (14) | —H | —H | (4) | —H | (1) | (26) |
| YB-12 | —H | —H | (15) | —H | —H | (4) | —H | (4) | (27) |
| YB-13 | —H | —H | —H | —H | —H | (4) | —H | (4) | —H |
| YB-14 | —H | —H | —H | —H | —H | (5) | —H | (1) | (28) |
| YB-15 | —H | —H | (6) | —H | —H | (4) | —H | (1) | (17) |
| YB-16 | —H | —H | (6) | —H | —H | (4) | —H | (1) | (29) |
| YB-17 | —H | —H | (7) | —H | —H | (4) | —H | (1) | (29) |
| YB-18 | —H | —H | —H | —H | —H | —H | (7) | (4) | —H |
| YB-19 | —H | —H | (30) | (31) | —H | —H | —H | (1) | —H |
| YB-20 | —H | —H | (11) | —H | —H | (32) | —H | (4) | (33) |

(1) —Cl, (2) $—CH_2$, (3) $—C_{18}H_{37}$,
(4) $—OCH_3$, (5) $—NHCOC_{17}H_{35}$, (6) $—COOC_{12}H_{25}$,
(7)

-continued
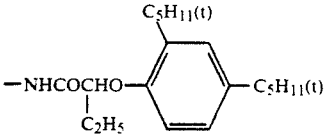
(8)
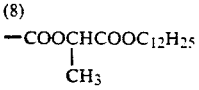
(9)
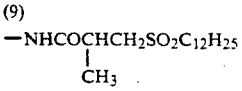
(10)
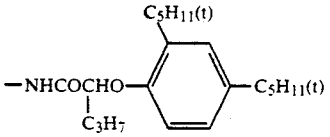
(11)
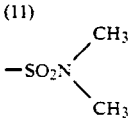
(12)
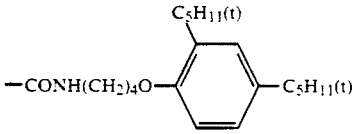
(13)
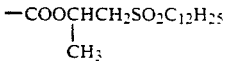
(14)
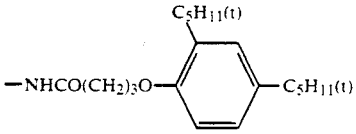
(15)
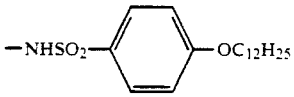
(16)
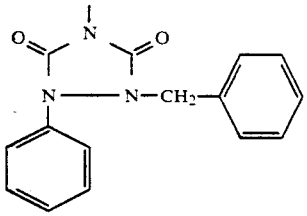
(17)
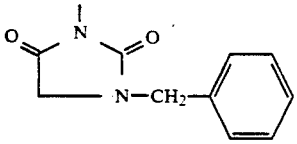
(18)
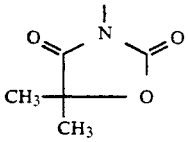
(19)

-continued
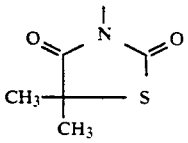
(20)
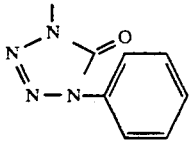
(21)
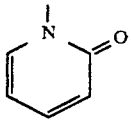
(22)
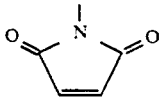
(23)
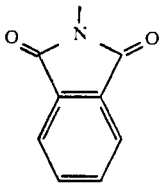
(24)
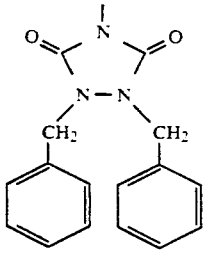
(25)
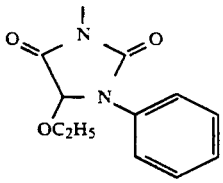
(26)
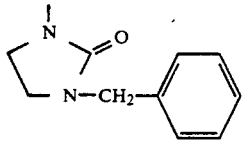
(27)
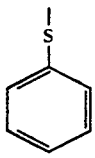

-continued (28)

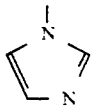

(29)

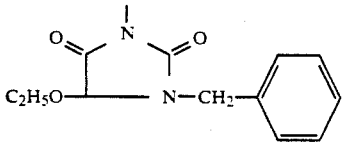

(30)

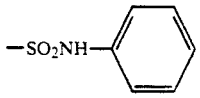

(31)
$-OC_{18}H_{37}$
(32)
$-OC_{16}H_{33}$
(33)

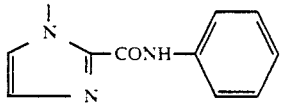

The yellow couplers listed above are preferably added in amounts of $1\times10^{-3}$ to 1 mole, more preferably $1\times10^{-4\ 3}$ to $8\times10^{-1}$ mole, per mole of silver halide.

Magenta couplers that are preferably used in the present invention are represented by the following general formula (M-I):

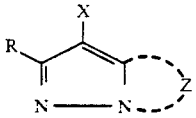

(M-I)

where Z signifies the non-metallic atomic group necessary to form a nitrogenous heterocyclic ring, with the ring formed by Z optionally having a substituent; X is a hydrogen atom or a group that can be eliminated upon reaction with the oxidation product of a color developing agent; and R is a hydrogen atom or a substituent:

The substituents denoted by R are in no way limited but may be exemplified by alkyl, aryl, anilino, acylamino, sulfonamido, alkylthio, arylthio, alkenyl, cycloalkyl, etc. Other examples include: a halogen atom; groups such as cycloalkenyl, alkynyl, heterocyclic ring, sulfonyl, sulfinyl, phosphonyl, acyl, carbamoyl, sulfamoyl, cyano, alkoxy, aryloxy, heterocyclic oxy, siloxy, acyloxy, carbamoyloxy, amino, alkylamino, imido, ureido, sulfamoylamino, alkoxycarbonylamino, aryloxycarbonylamino, alkoxycarbonyl, aryloxycarbonyl and heterocyclic thio; and residues such as a spiro compound residue and a bridged hydrocarbon compound residue.

The alkyl group denoted by R may be straight-chained or branched and it preferably has 1–32 carbon atoms. The aryl group denoted by R is preferably a phenyl group Examples of the acylamino group denoted by R include alkylcarbonylamino and arylcarbonylamino groups. Examples of the sulfonamido group denoted by R include alkylsulfonylamino and arylsulfonylamino groups. The alkyl and aryl portions of the alkylthio and arylthio groups denoted by R may be exemplified by the alkyl and aryl groups listed above as examples of R. The alkenyl group denoted by R may be straight-chained or branched and it preferably has 2–32 carbon atoms. The cycloalkyl group denoted by R preferably has 3–12 carbon atoms, with the presence of 5–7 carbon atoms being particularly preferred. The cycloalkenyl group denoted by R preferably has 3–12 carbon atoms, more preferably 5–7 carbon atoms. Examples of the sulfonyl group denoted by R include alkylsulfonyl and arylsulfonyl groups. Examples of the sulfinyl groups denoted by R include alkylsulfinyl and arylsulfinyl groups. Examples of the phosphonyl group denoted by R include alkylphosphonyl, alkoxyphosphonyl, aryloxyphosphonyl and arylphosphonyl groups. Examples of the acyl group denoted by R include alkylcarbonyl and arylcarbonyl groups. Examples of the carbamoyl group denoted by R include alkylcarbamoyl and arylcarbamoyl groups. Examples of the sulfamoyl group denoted by R include alkylsulfamoyl and arylsulfamoyl groups. Examples of the acyloxy group denoted by R include alkylcarbonyloxy and arylcarbonyloxy groups. Examples of the carbamoyloxy group denoted by R include alkylcarbamoyloxy and arylcarbamoyloxy groups. Examples of the ureido group denoted by R include alkylureido and arylureido groups. Examples of the sulfamoylamino group denoted by R include alkylsulfamoylamino and arylsulfamoylamino groups. The heterocyclic group denoted by R is preferably 5- to 7-membered and may be illustrated by 2-furyl, 2-thienyl, 2-pyrimidinyl and 2-benzothiazolyl groups. The heterocyclic oxy group denoted by R preferably has a 5- to 7-membered heterocyclic ring and may be exemplified by 3,4,5,6-tetrahydropyranyl-2-oxy and 1-phenyltetrazol-5-oxy group. The heterocyclic thio group denoted by R is preferably 5- to 7-membered ring and may be exemplified by 2-pyridylthio, 2-benzothiazolylthio, 2,4-diphenoxy-1,3,5-triazol-6-thio groups.

Examples of the siloxy group denoted by R include trimethylsiloxy, triethylsiloxy and dimethylbutylsiloxy groups. Examples of the imido group denoted by R include succinimido, 3-heptadecylsuccinimido, phthalimido and glutarimido groups. An example of the spiro compound residue denoted by R is spiro[3,3]-heptan-1-yl. Examples of the bridged hydrocarbon compound residue denoted by R include bicyclo[2,2,1]heptan-1-yl, tricyclo[3,3,1,1$^{3,7}$]-decan-1-yl and 7,7-dimethyl-bicyclo[2,2,1]heptan-1-yl.

Examples of the group denoted by X which can be eliminated upon reaction with the oxidation product of a color developing agent include: a halogen atom (e.g., chlorine, bromine or fluorine atoms) and groups such as alkoxy, aryloxy, heterocyclic oxy, acyloxy, sulfonyloxy, alkoxycarbonyloxy, aryloxycarbonyl, alkyloxyalyloxy, alkoxyoxalyloxy, alkylthio, arylthio, heterocyclic thio, alkyloxythiocarbonylthio, acylamino, sulfonamido, a nitrogenous heterocyclic ring bound with a nitrogen atom, alkyloxycarbonylamino, aryloxycarbonylamino, carboxyl, and the group represented by the following formula:

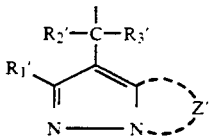

(where $R'_1$ is the same as defined for R; Z' is the same as defined for Z; $R'_2$ and $R'_3$ each represents a hydrogen atom, an aryl group, an alkyl group or a heterocyclic group). A halogen atom, in particular a chlorine atom, is preferred.

Examples of the nitrogenous heterocyclic ring formed by Z or Z' include pyrazole, imidazole, triazole and tetrazole rings; these rings may have any of the substituents mentioned above in connection with R.

The magenta couplers represented by the general formula (M-I) are more specifically represented by the following general formulas (M-II) to (M-VII):

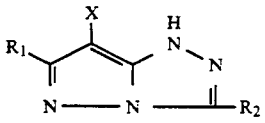

(M-II)

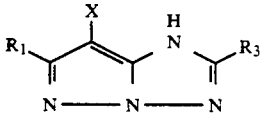

(M-III)

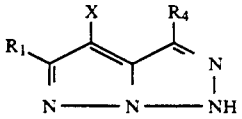

(M-IV)

-continued

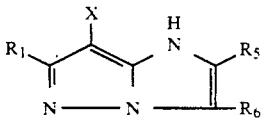

(M-V)

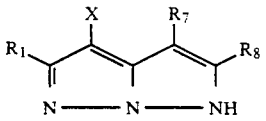

(M-VI)

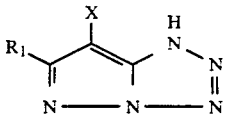

(M-VII)

In the general formulas (M-II) to (M-VII), $R_1$ to $R_8$ and X have the same meanings as R and X in the general formula (M-I).

The most preferred compound of the general formula (M-I) is represented by the following general formula (M-VIII):

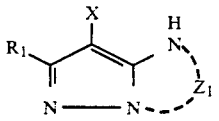

(M-VIII)

where $R_1$, X and $Z_1$ have the same meanings as R, X and Z in the general formula (M-I).

Among the magenta couplers represented by the general formulas (M-II) to (M-VII), the one represented by the general formula (M-II) is particularly preferred.

Substituents R and $R_1$ on the heterocyclic ring described above are most preferably represented by the following general formula (M-IX):

$$R_9—CH_2— \quad \text{(M-IX)}$$

where $R_9$ have the same meaning as R in the general formula (M-I). $R_9$ is preferably a hydrogen atom or an alkyl group.

The substituent that may be present on the ring formed by Z in the general formula (M-I) or the ring formed by $Z_1$ in the general formula (M-VIII), as well as $R_2$ to $R_8$ in the general formulas (M-II) to (M-VI) are preferably represented by the following general formula (M-X):

$$—R^1—SO_2—R^2 \quad \text{(M-X)}$$

where $R^1$ is an alkylene group; and $R^2$ is an alkyl, cycloalkyl or aryl group. The alkylene group denoted by $R^1$ preferably has at least 2 carbon atoms, more preferably 3 to 6 carbon atoms in the linear portion, and it may be straight-chained or branched. The cycloalkyl group represented by $R^2$ is preferably 5- or 6-membered.

Typical examples of the magenta couplers that may be employed in the present invention are shown specifically below.

M-1
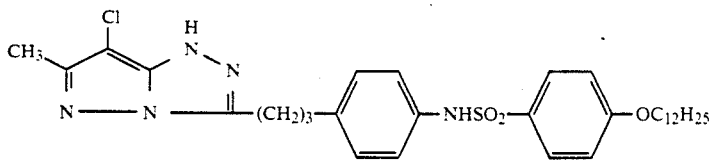
M-2
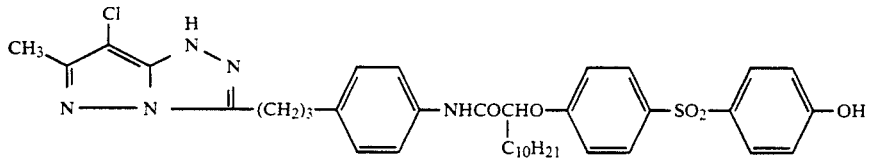
M-3
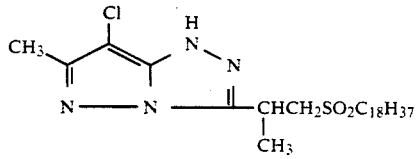
M-4
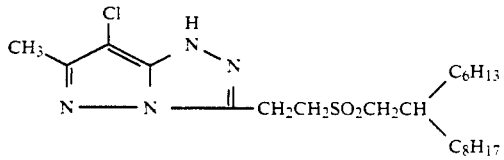
M-5
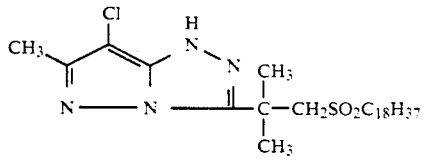
M-6
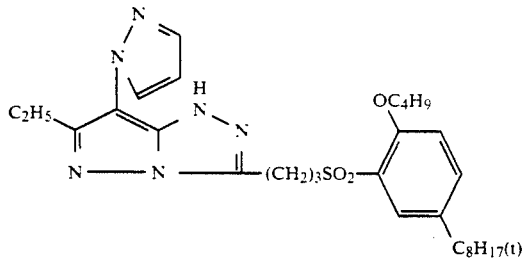
M-7
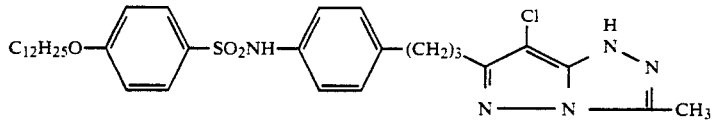
M-8
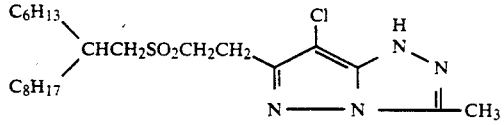
M-9
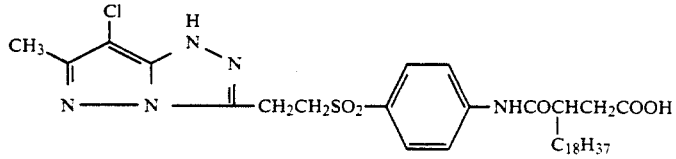

-continued
M-10
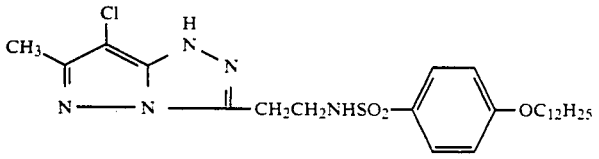
M-11
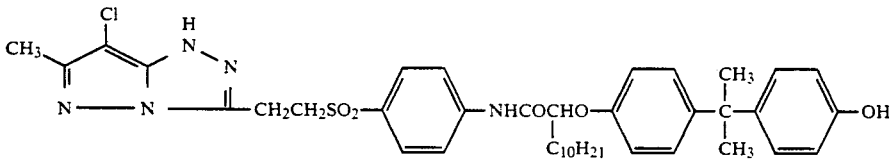
M-12
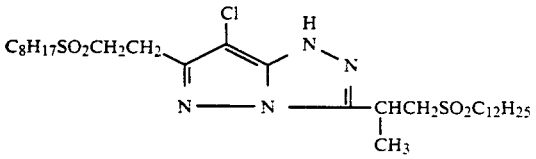
M-13
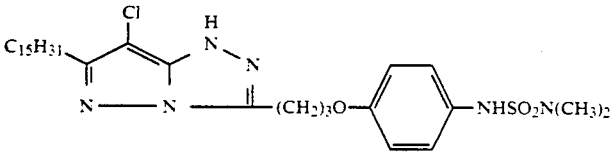
M-14
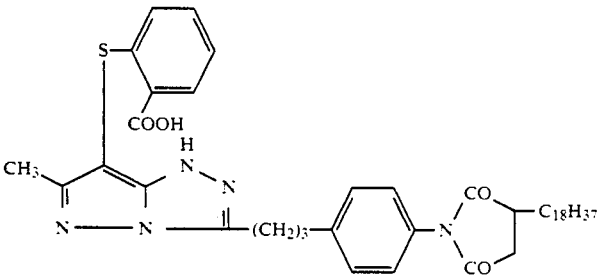
M-15
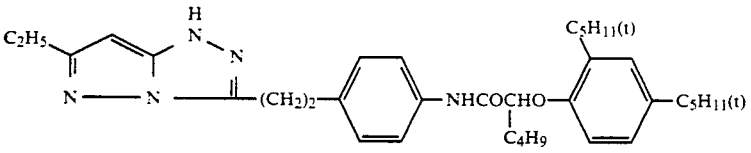
M-16
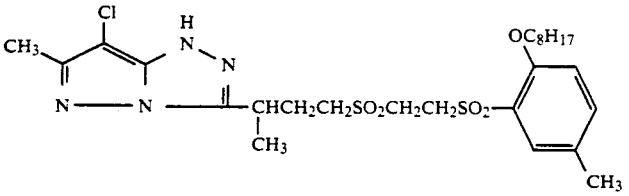
M-17
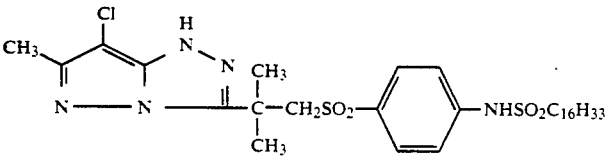

-continued
M-18
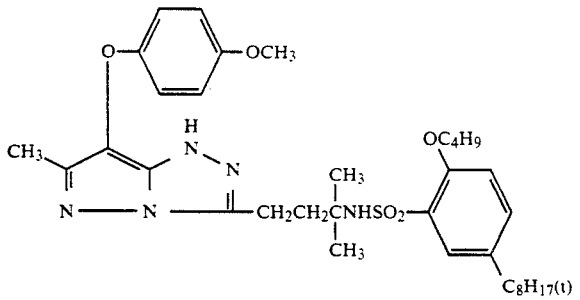
M-19
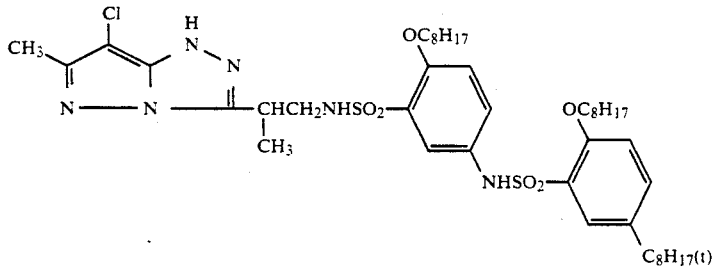
M-20
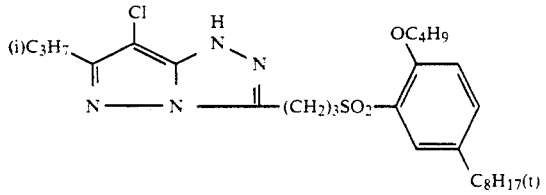
M-21
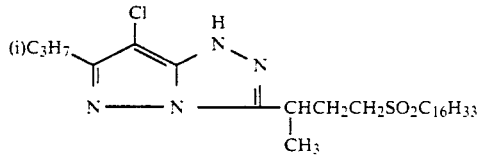
M-22
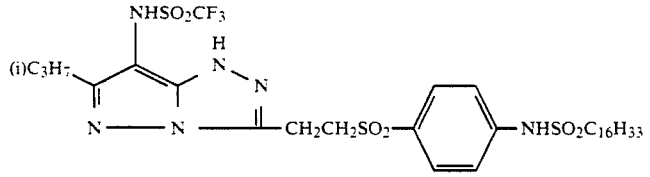
M-23
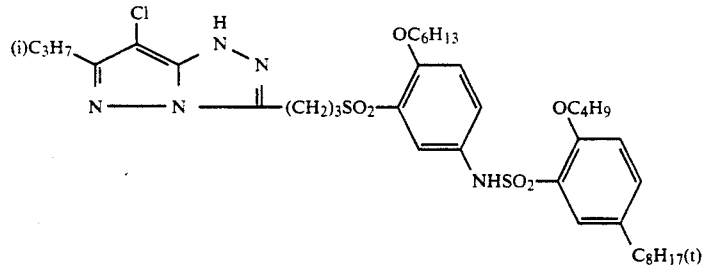
M-24
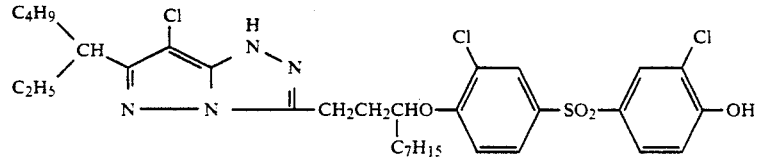

-continued
M-25
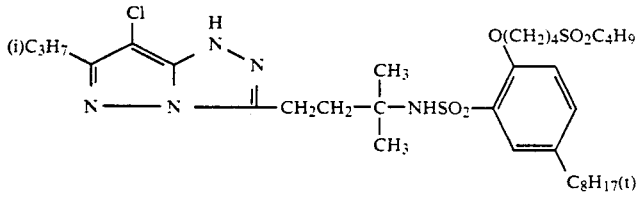
M-26
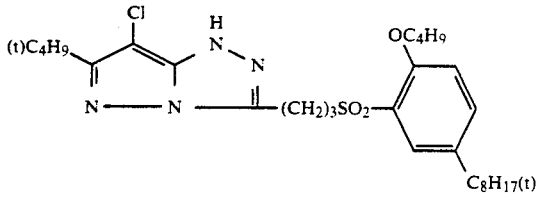
M-27
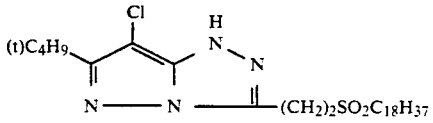
M-28
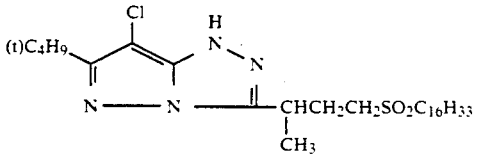
M-29
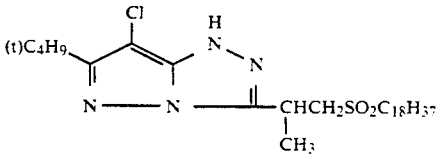
M-30
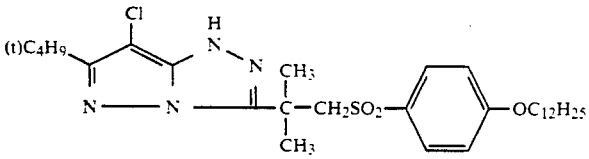
M-31
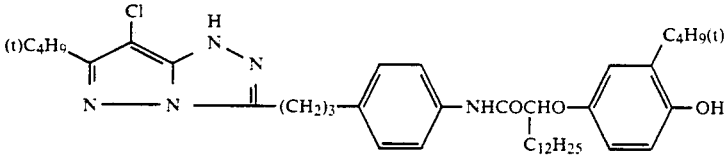
M-32
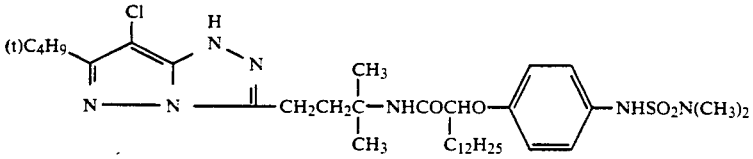
M-33
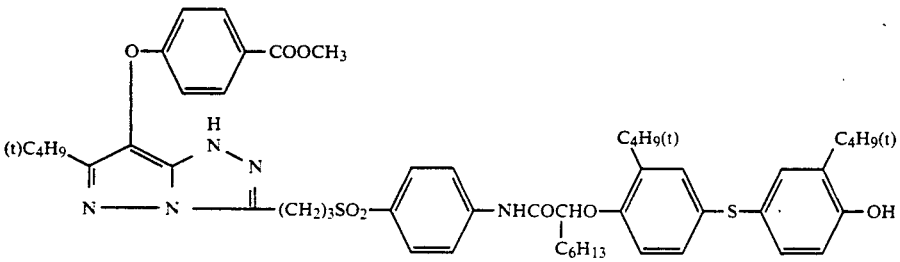

-continued
M-34
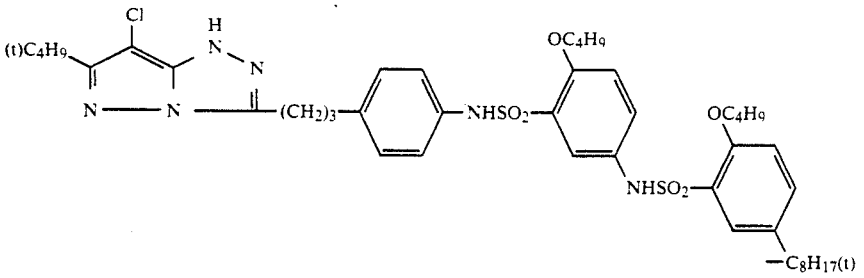
M-35
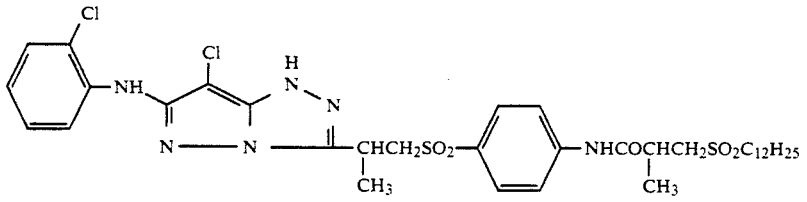
M-36
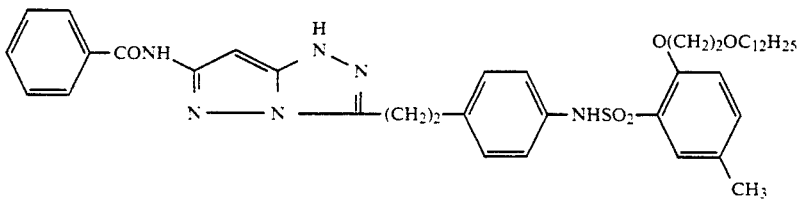
M-37
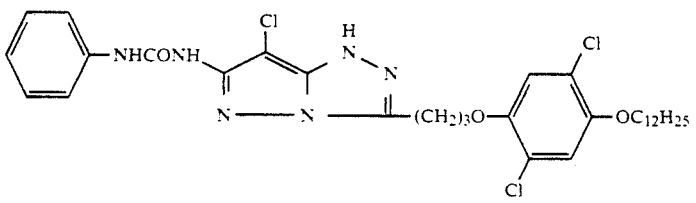
M-38
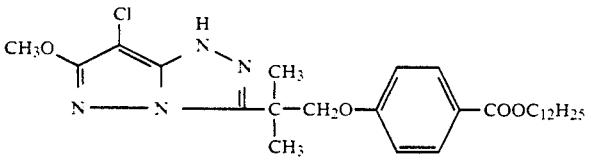
M-39
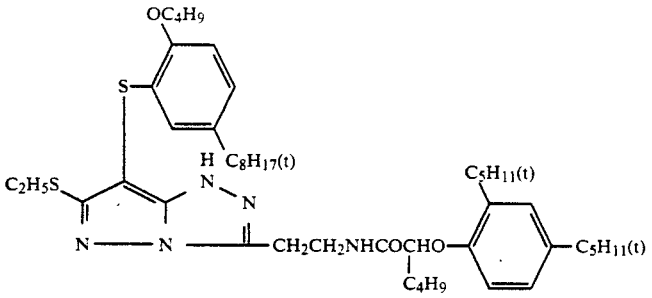
M-40
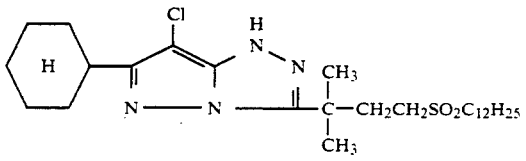

-continued
M-41
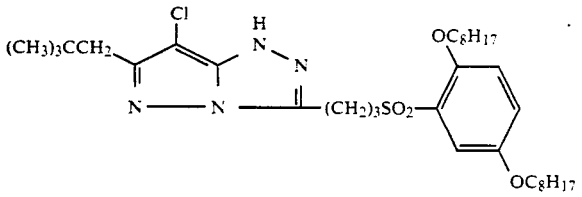
M-42
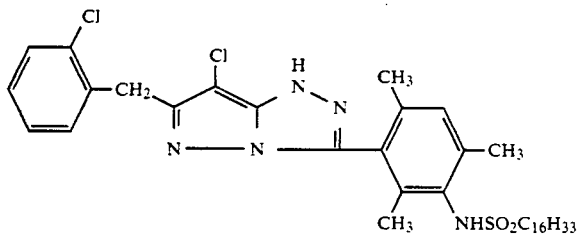
M-43
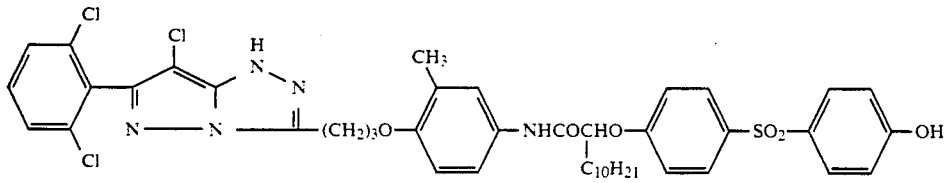
M-44
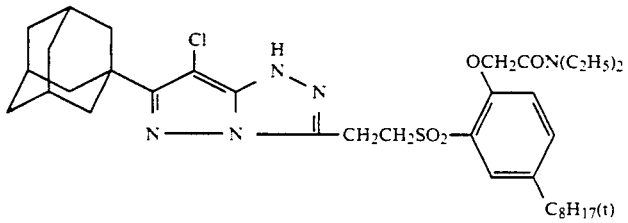
M-45
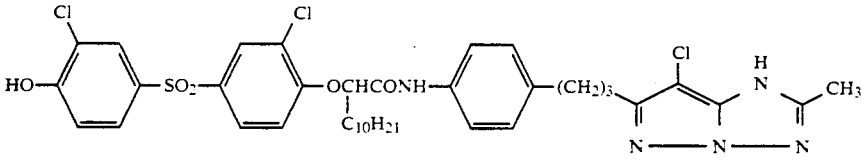
M-46
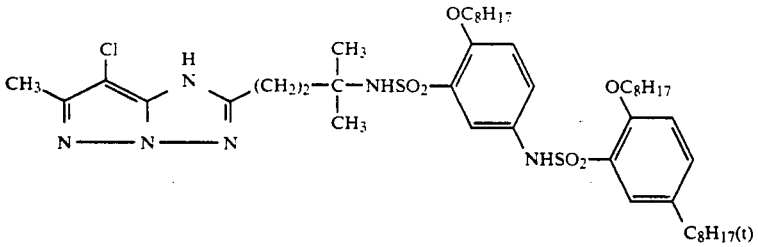
M-47
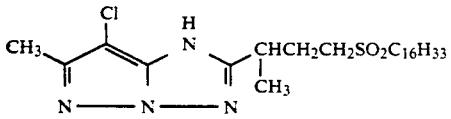
M-48
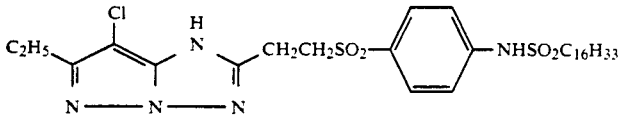

-continued
M-49
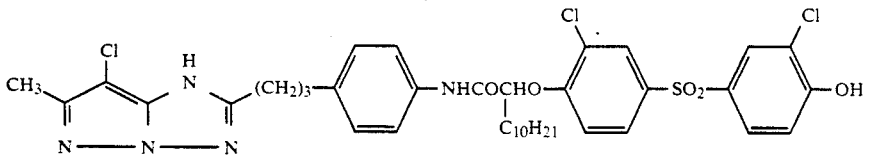
M-50
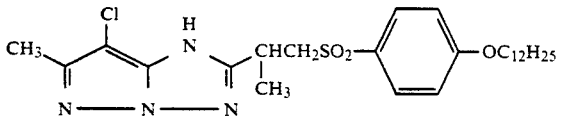
M-51
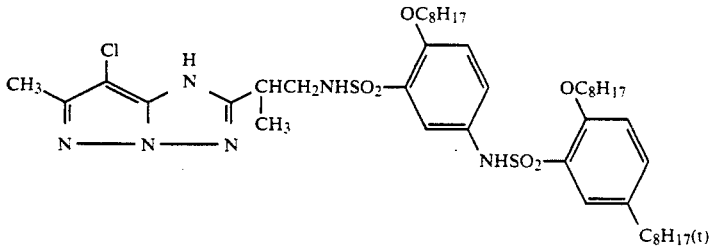
M-52
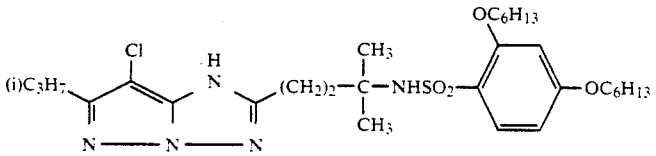
M-53
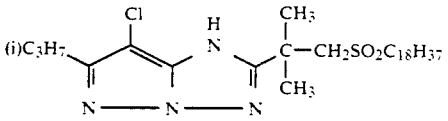
M-54
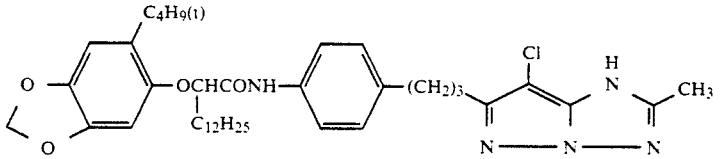
M-55
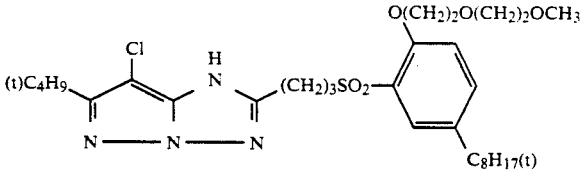
M-56
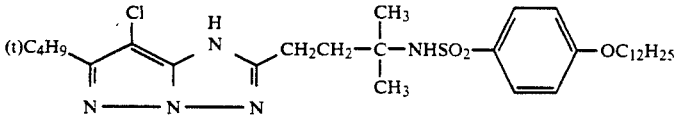
M-57
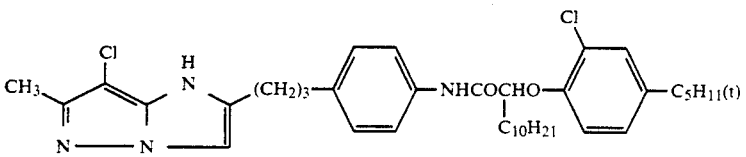

-continued

M-58

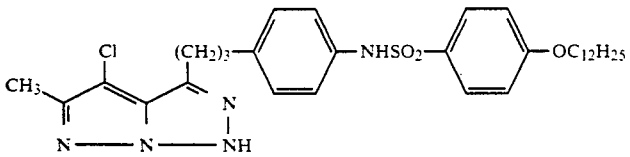

M-59

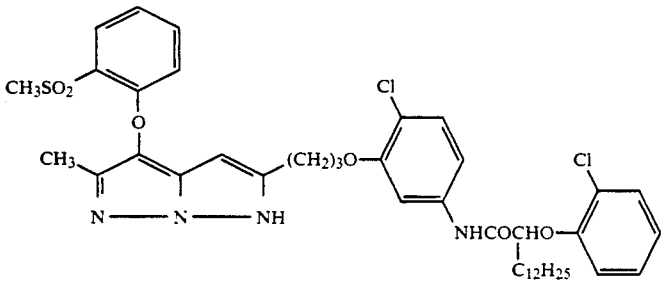

M-60

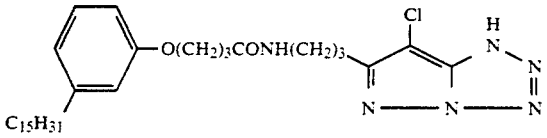

M-61

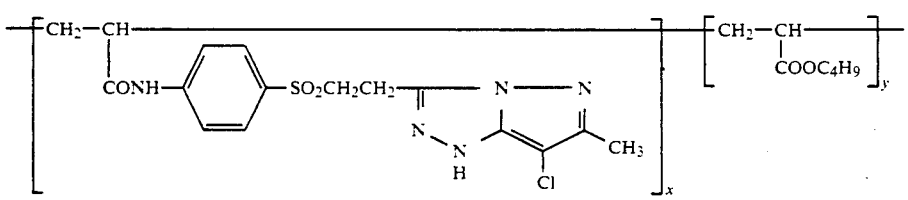

x:y = 50:50

M-62

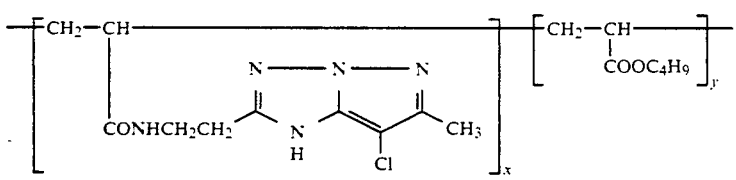

x:y = 50:50

Besides the typical examples given above, magenta couplers suitable for use in the present invention may be selected from among Compound Nos. 1-4, 6, 8-17, 19-43, 45-59, 61-104, 106-121, 123-162 and 164-223 listed on pages 66 to 122 of the specification of Japanese Patent Application (OPI) No. 166339/1987.

The magenta couplers described above can be synthesized with reference to Journal of the chemical Society, Perkin I, 1977, 2047-2052 and prior patents including U.S. Pat. No. 3,725,067, and Japanese Patent application (OPI) Nos. 99437/1984, 42045/1983, 162548/1984, 171956/1984, 33552/1985, 43659/1985, 172982/1985 and 190779/1985.

The magenta couplers are normally used in amounts ranging from $1\times10^{-3}$ to 1 mole, preferably from $5\times10^{-3}$ to $8\times10^{-1}$ moles, per mole of silver halide.

The preferred magenta couplers described above may be employed in combination with other kinds of magenta couplers.

The naphtholic cyan couplers that are preferably used in the present invention are represented by the following general formula (CN):

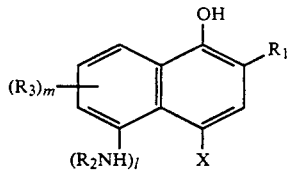

(CN)

where $R^1$ is $-CONR_4R_5$, $-NHCOR_4$, $-NHCOOR_6$, $-NHSO_2R_6$, $-1NHCONR_4R_5$ or $-NHSO_2NR_4R_5$; $R_2$ is a monovalent group; $R_3$ is a substituent; X is a hydrogen atom or a group that is eliminated upon reaction with the oxidation product of an aromatic primary amino developing agent; l is 0 or 1; m is an integer of 0-3; $R_4$ and $R_5$ each represents a hydrogen atom, an aromatic group, an aliphatic group or a heterocyclic group; $R_6$ is an aromatic group, an aliphatic group or a heterocyclic group; when m is 2 or 3, $R_3$ may be the same or different and may combine with each other to form a ring; $R_4$ and $R_5$, $R_2$ and $R_3$ or $R_2$ and X may combine with each other to form a ring; when l is 0, then m is 0, $R^1$ is —$CONHR_7$ and $R_7$ is an aromatic group; and each of the groups represented by $R_2$–$R_7$ may optionally have a substituent.

Preferred examples of $R_6$ are aliphatic groups having 1–30 carbon atoms, aromatic groups having 6–30 carbon atoms and heterocyclic groups having 1–30 carbon atoms. Preferred examples of $R_4$ and $R_5$ include a hydrogen atom and the groups mentioned above as preferred examples of $R_6$.

Preferred examples of $R_2$ include a hydrogen atom, aliphatic groups having 1–30 carbon atoms, aromatic groups having 6–30 carbon atoms, heterocyclic groups having 1–30 carbon atoms, —$OR_8$, —$COR_8$,

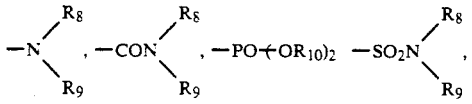

—$CO_2R_{10}$, —$SO_2R_{10}$ and —$SO_2OR_{10}$ (where $R_8$, $R_9$ and $R_{10}$ are the same as defined for $R_4$, $R_5$ and $R_6$, respectively, and $R_8$ and $R_9$ may combine to form a hetero cyclic ring), these groups being bound to NH either directly or indirectly via NH, CO or $SO_2$.

A preferred example of $R_7$ is an aromatic group having 6–30 carbon atoms. Typical substituents on $R_7$ include: a halogen atom, a hydroxyl group, an amino group, a carboxyl group, a sulfonic acid group, a cyano group, an aromatic group, a hetero group, a carbonamido group, a sulfonamido group, a carbamoyl group, a sulfamoyl group, a ureido group, an acyl group, an acyloxy group, an aliphatic oxy group, an aromatic oxy group, an aliphatic thio group, an aromatic thio group, an aliphatic sulfonyl group, an aromatic sulfonyl group, a sulfamoylamino group, a nitro group, an imido group, an aliphatic group, and an aliphatic oxycarbonyl group. When $R_7$ has more than one substituent, the substituents may combine together to form a ring, as in the case of a dioxymethylene group.

Typical examples of $R_3$ include: a halogen atom, a hydroxyl group, an amino group, a carboxyl group, a sulfonic acid group, a cyano group, an aromatic group, a heterocyclic group, a carbonamido group, a sulfonamido group, a carbamoyl group, a sulfamoyl group, a ureido group, an acyl group, an acyloxy group, an aliphatic oxy group, an aromatic oxy group, an aliphatic thio group, an aromatic thio group, an aliphatic sulfonyl group, an aromatic sulfonyl group, a sulfamoylamino group, a nitro group and an imido group. The number of carbon atoms present in $R_3$ preferably ranges from 0 to 30. An example of cyclic $R_3$ when n=2 is a dioxymethylene group.

When l is 1, a particularly preferred example of $R_1$ is —$CONR_4R_5$, and m is preferably 0, with $R_2$ being preferably selected from among —$COR_8$, —$COOR_{10}$, —$SO_2R_{10}$, —$CONR_8R_9$ and —$SO_2NR_8R_9$ which are bound directly to NH. Among these, —$COOR_{10}$, —$COR_8$ and —$SO_2R_{10}$ which are bound directly to NH are particularly preferred, with —$COOR_{10}$ being most preferred. Dimers and higher oligomers formed through $R_1$ to $R_3$ and X are also included within the scope of the present invention.

Specific examples of the couplers represented by the general formula (CN) are described in such prior patents as Japanese Patent Application (OPI) Nos. 237448/1985, 153640/1986, 145557/1986, 85242/1987, 15529/1973, 117422/1975, 18315/1977, 90932/1977, 52423/1978, 48237/1979, 66129/1979, 32071/1980, 65957/1980, 105226/1980, 1938/1981, 12643/1981, 27147/1981, 126832/1981 and 95346/1983, as well as U.S. Pat. No. 3,488,193. Methods of synthesis are also described in these patents.

Non-limiting typical examples of the cyan couplers represented by the general formula (CN) are listed below:

CN-1

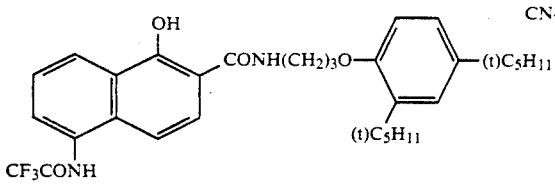

CN-2

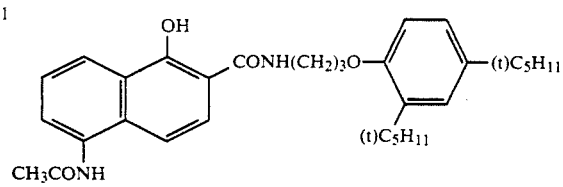

CN-3

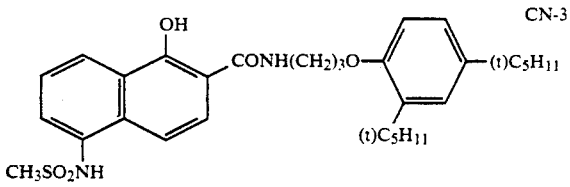

CN-4

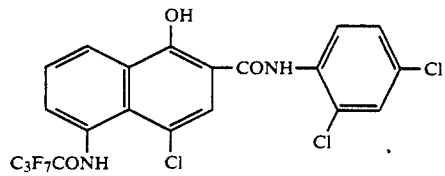

CN-5

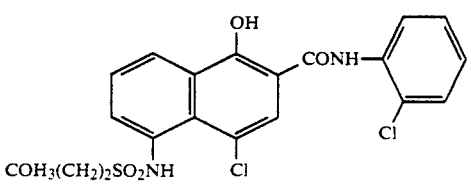

CN-6

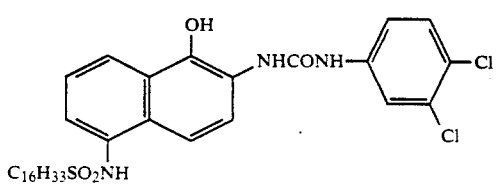

-continued
CN-7
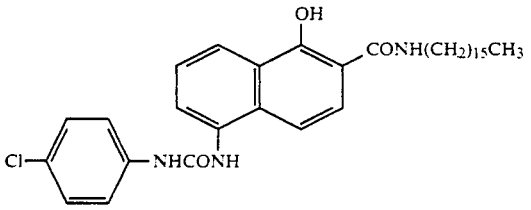
CN-8
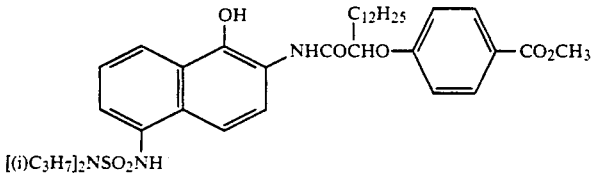
CN-9
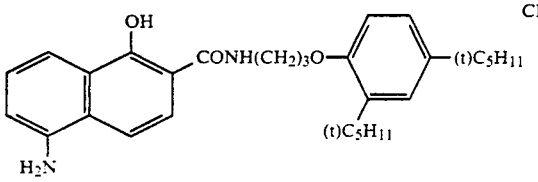
CN-10
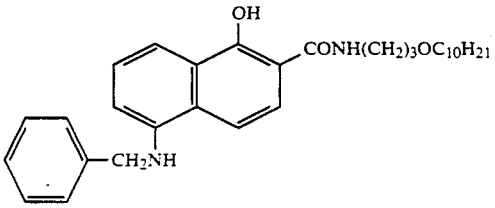
CN-11
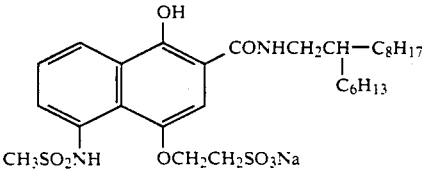
CN-12
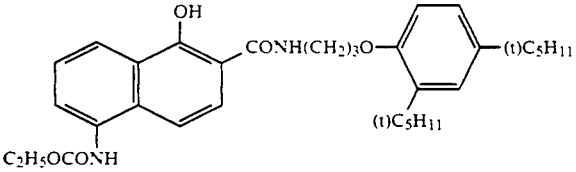
CN-13
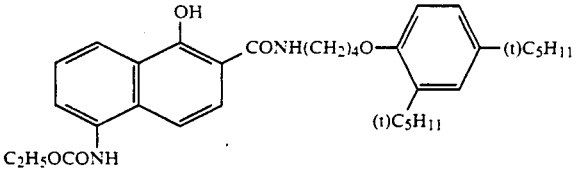
CN-14
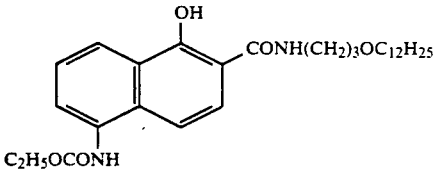
CN-15
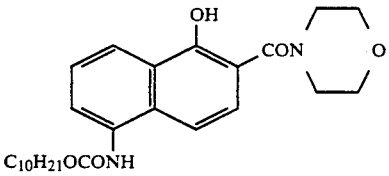
CN-16
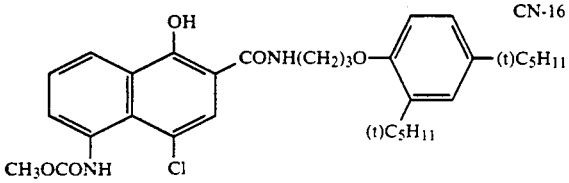
CN-17
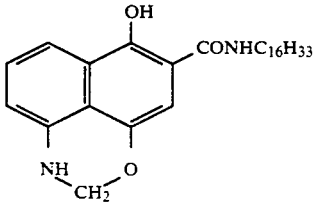

-continued
CN-18
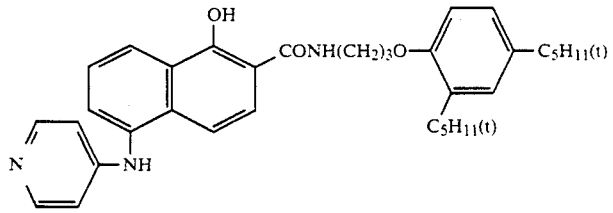
CN-19
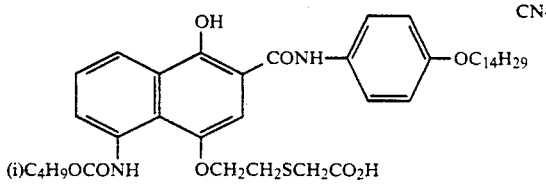
CN-20
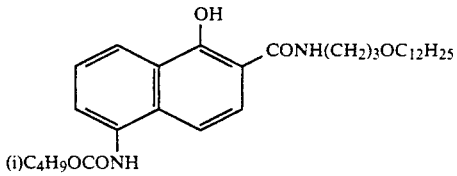
CN-21
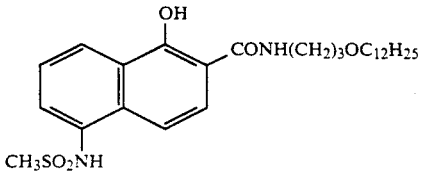
CN-22
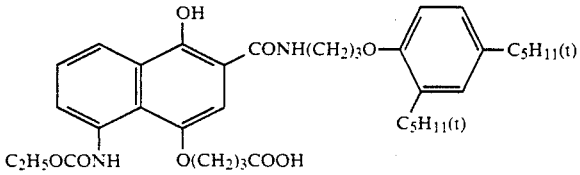
CN-23
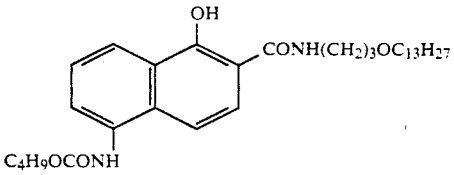
CN-24
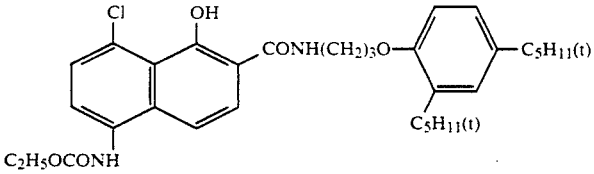
CN-25
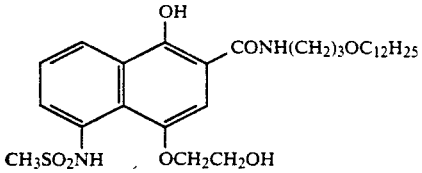
CN-26
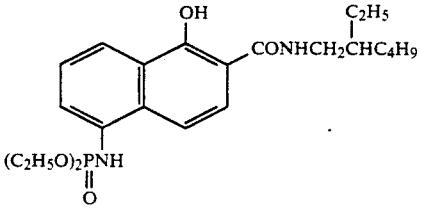
CN-27
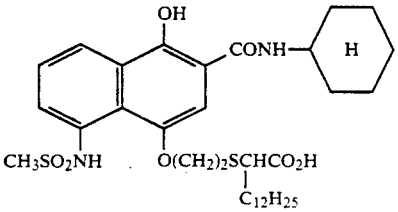
CN-28
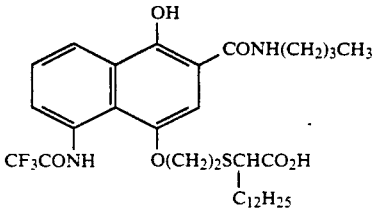

-continued
CN-29
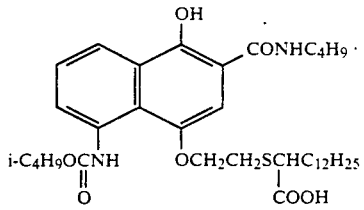
CN-30
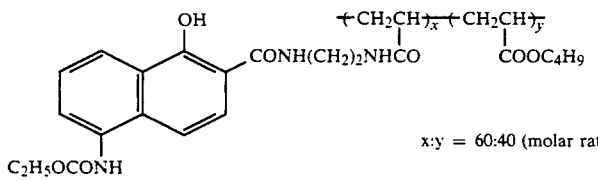
x:y = 60:40 (molar ratio)
CN-31
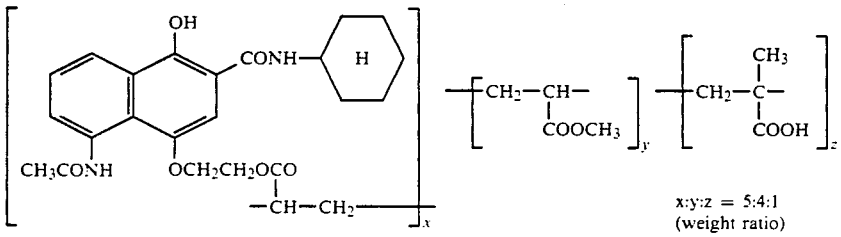
x:y:z = 5:4:1
(weight ratio)
CN-32
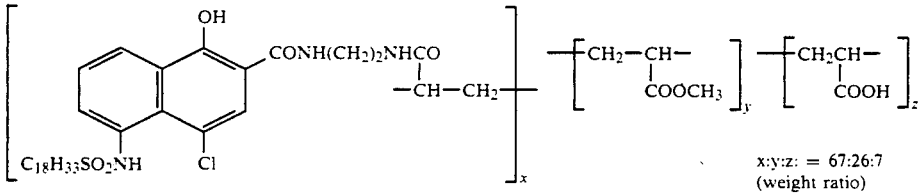
x:y:z: = 67:26:7
(weight ratio)
CN-33
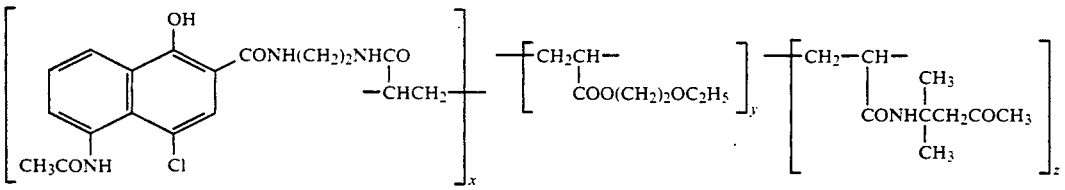
x:y:z = 2:1:1
(weight ratio)
CN-34
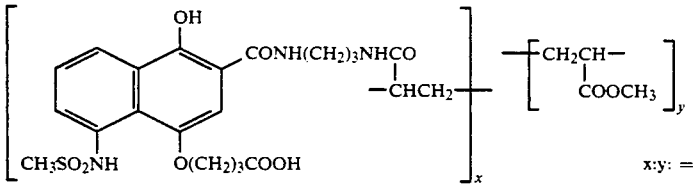
x:y: = 1:4 (weight ratio)
CN-35
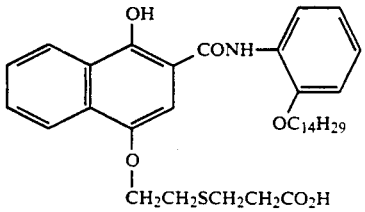
CN-36
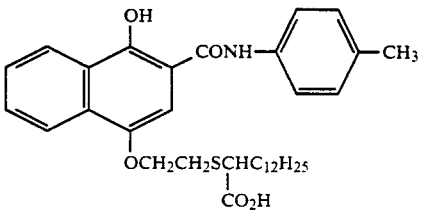

-continued
CN-37
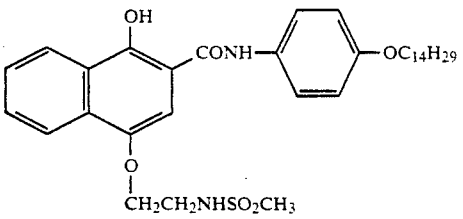
CN-38
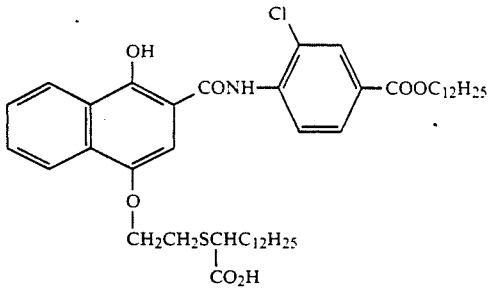
CN-39
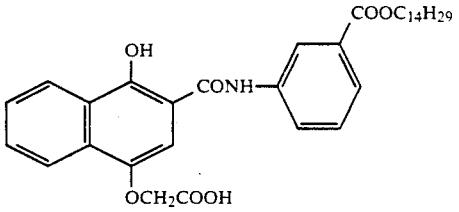
CN-40
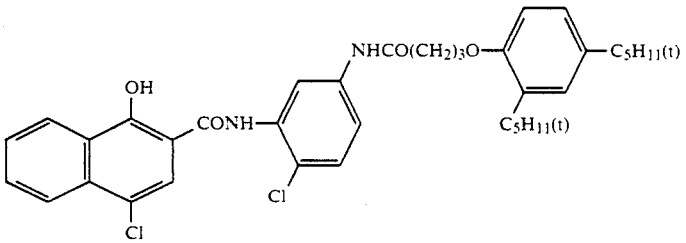
CN-41
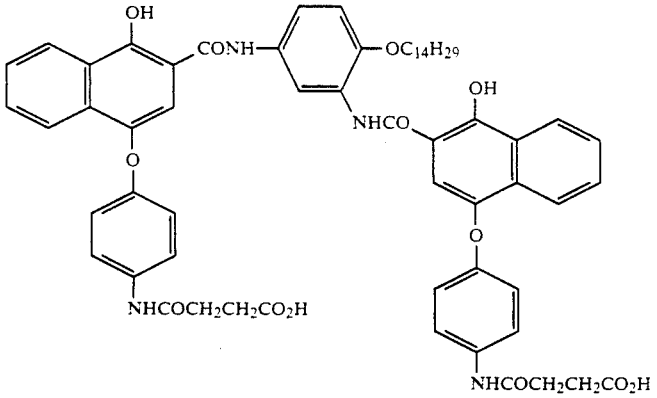
CN-42
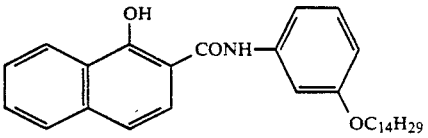
CN-43
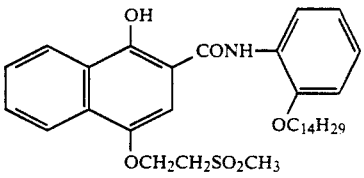
CN-44
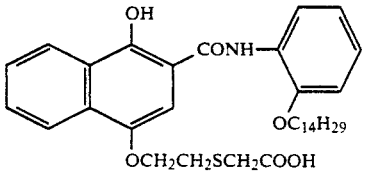
CN-45
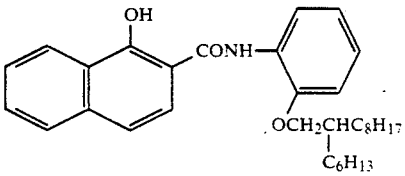

-continued
CN-46
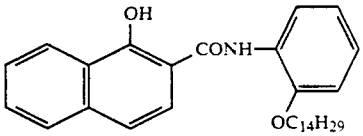
CN-47
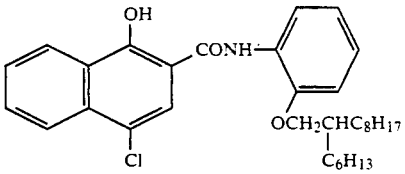
CN-48
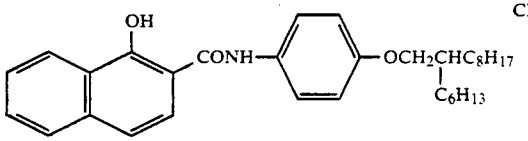
CN-49
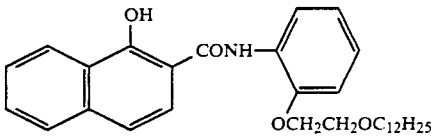
CN-50
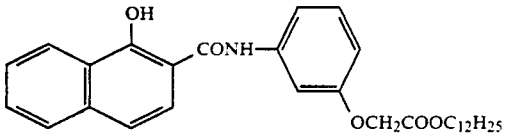
CN-51
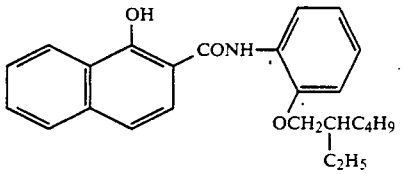
CN-52
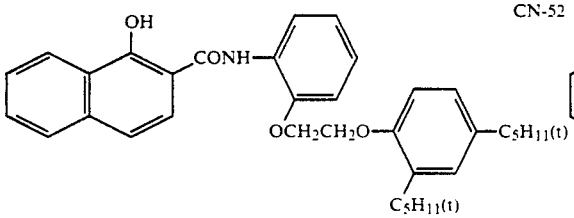
CN-53
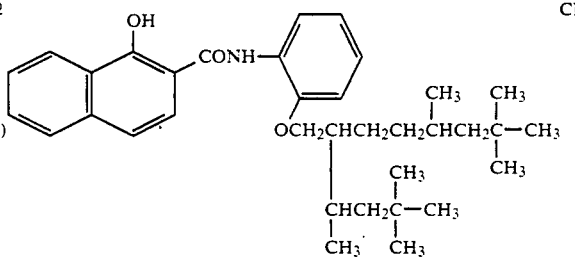
CN-54
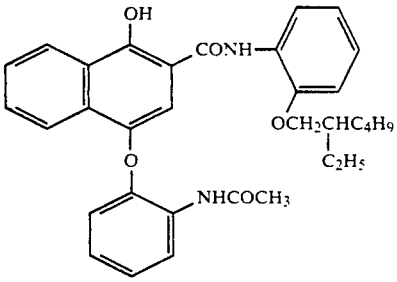
CN-55
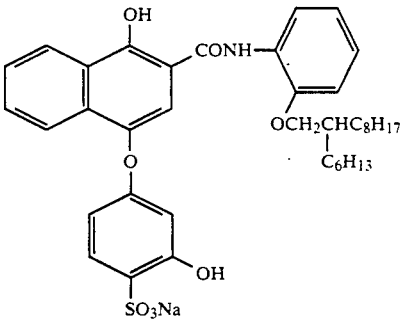
CN-56
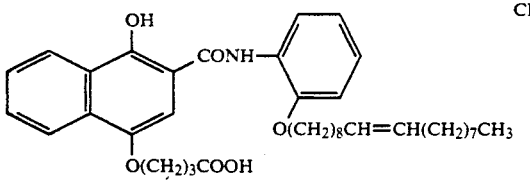
CN-57
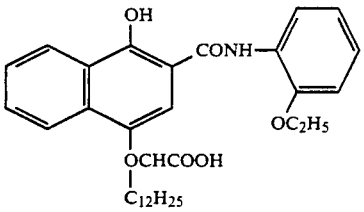
CN-58
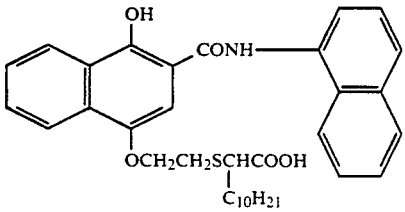
CN-59
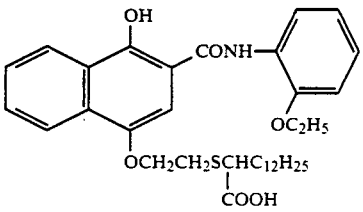

-continued

CN-60

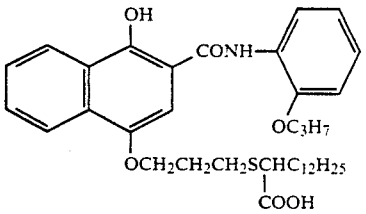

CN-61

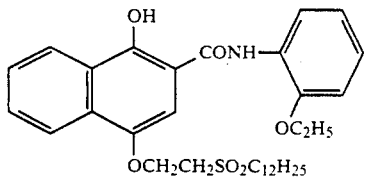

CN-62

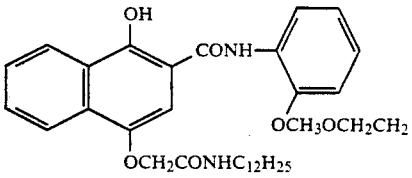

CN-63

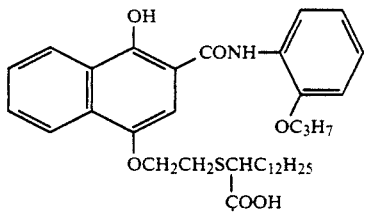

CN-64

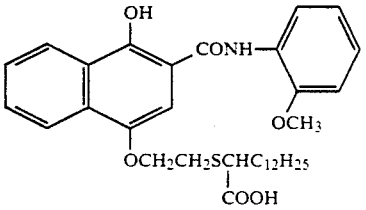

CN-65

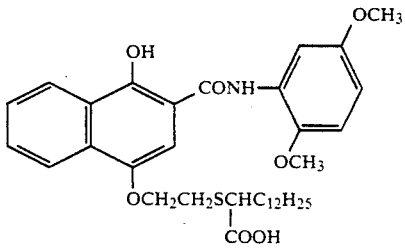

CN-66

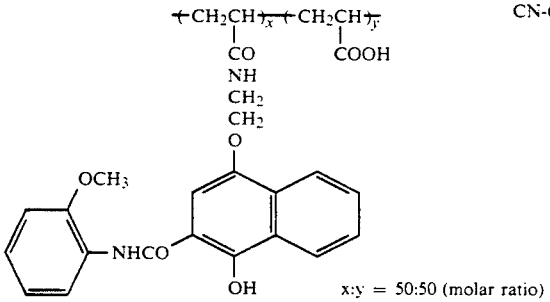

x:y = 50:50 (molar ratio)

CN-67

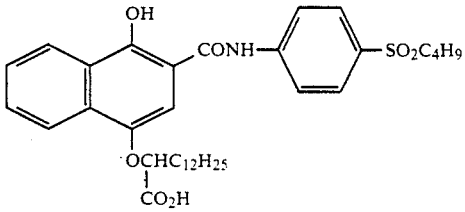

CN-68

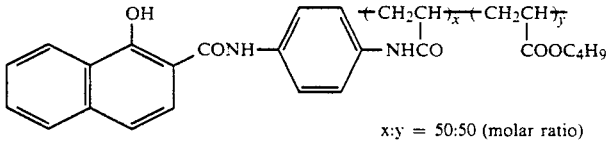

x:y = 50:50 (molar ratio)

The ureidophenolic cyan couplers that are preferably used in the present invention are preferably represented by the following general formula (CU):

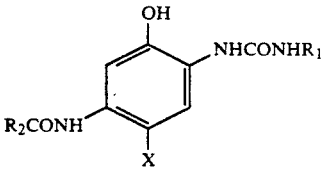

(CU)

where X is a hydrogen atom or a group that can be eliminated upon coupling with an aromatic primary amino color developing agent; $R_1$ is an aryl group or a heterocyclic group; $R_2$ is an aliphatic group or an aryl group; each of the groups denoted by $R_1$ and $R_2$ may have a substituent and may form a dimer or higher oligomers; $R_1$ and $R_2$, taken either independently or in combination, have the shape or size necessary to impart non-diffusing property to the coupler represented by the general formula (CU) or a dye formed of said coupler.

Examples of the aryl group denoted by $R_1$ or $R_2$ are phenyl and naphthyl groups. Illustrative substituents on the group denoted by $R_1$ or $R_2$ include nitro, cyano, halogen, alkyl, aryl, amino, hydroxy, acyl, alkoxycarbonyl, aryloxy-carbonyl, alkylsulfonyl, arylsulfonyl, alkoxysulfonyl, aryloxysulfonyl, carbamoyl, sulfamoyl, acyloxy, carbonamido, and sulfonamido. The number of substituents present is preferably 1-5. If more than one substituent is present, the substituents may be the same or different.

Preferred substituents on $R_1$ are alkylsulfonyl, cyano and halogen. A preferred substituent on $R_2$ is represented by the following general formula (CU-II):

(CU-II)

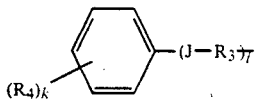

where J is an oxygen or sulfur atom; k is an integer of 0–4; l is 0 or 1; when k is 2 or more, $R_4$ may be the same or different; $R_3$ is an alkylene group; and $R_4$ is a substituent.

Examples of the substituent denoted by $R_4$ include alkyl, aryl, alkoxy, aryloxy, hydroxy, acyloxy, arylcarbonyloxy, carboxy, alkoxycarbonyl, aryloxycarbonyl, alkylthio, acyl, acylamino, sulfonamido, carbamoyl and sulfamoyl.

Examples of the leaving group denoted by X include groups, such as an aryloxy group, a carbamoyloxy group, a carbamoylmethoxy group, an acyloxy group, a sulfonamido group and a succinimido group, that have a halogen, an oxygen or nitrogen atom bonded directly to the coupling site. More specific examples of the leaving group are des-cribed in U.S. Pat. No. 3,741,563, Japanese Patent Application (OPI) No. 37425/1972, Japanese Patent Publication No. 36894/1973, Japanese Patent application (OPI) Nos. 10135/1975, 117422/1975, 130441/1975, 108841/1976, 120334/1975, 18315/1977, 105226/1978, etc.

Specific examples of the ureidophenolic coupler are listed below.

CU-1

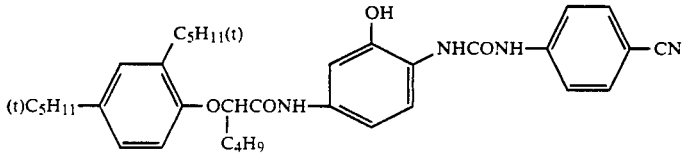

CU-2

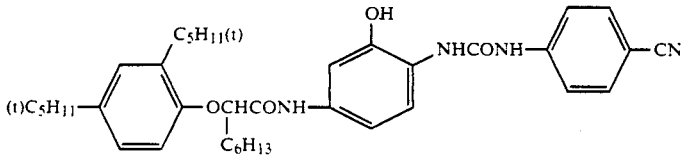

CU-3

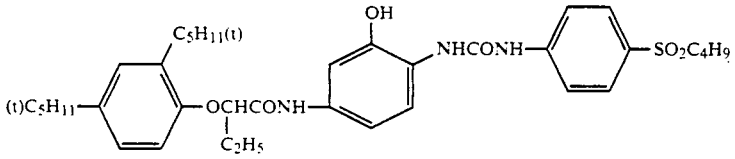

CU-4

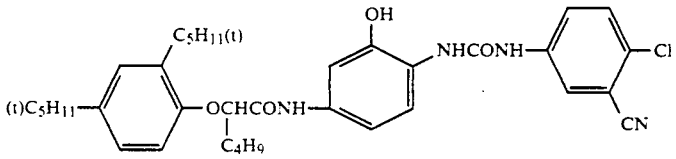

CU-5

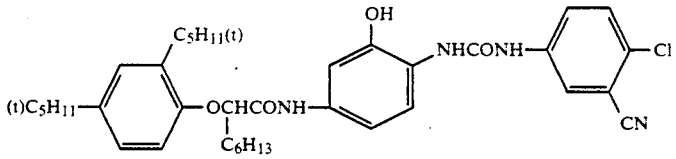

CU-6

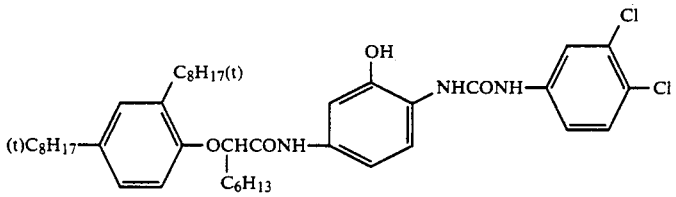

CU-7

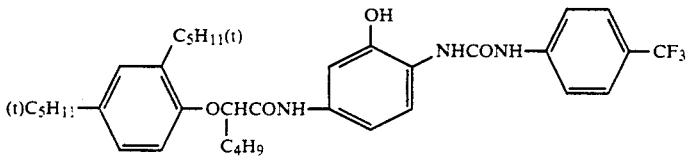

-continued
CU-8
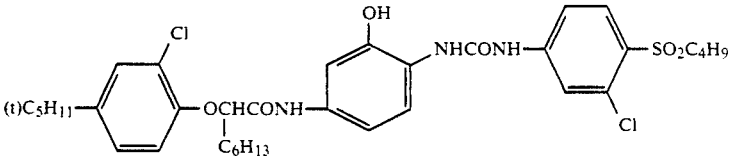
CU-9
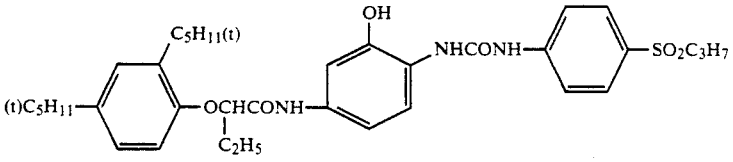
CU-10
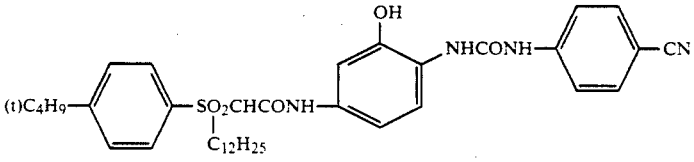
CU-11
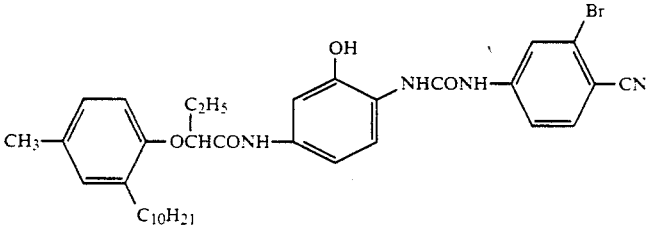
CU-12
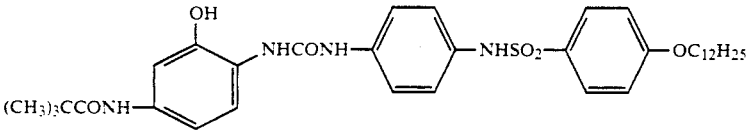
CU-13
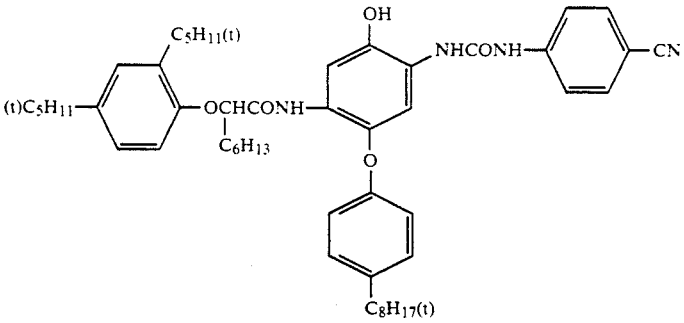
CU-14
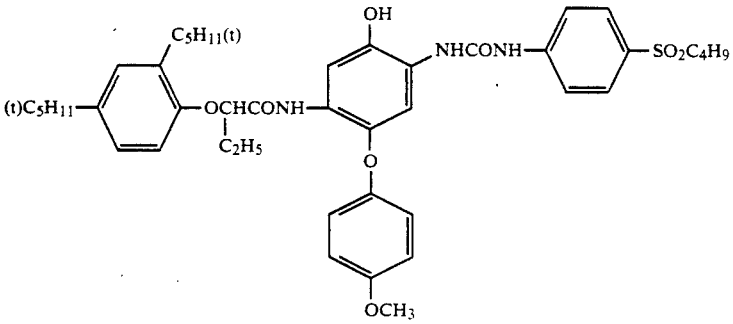

-continued
CU-15
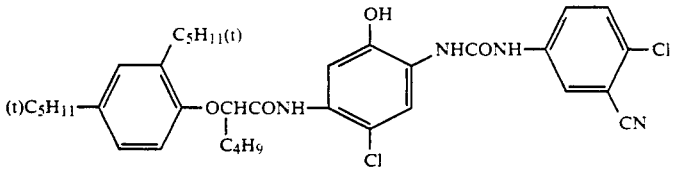
CU-16
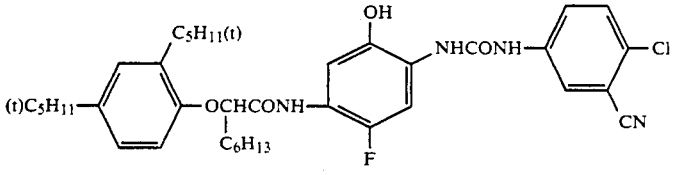
CU-17
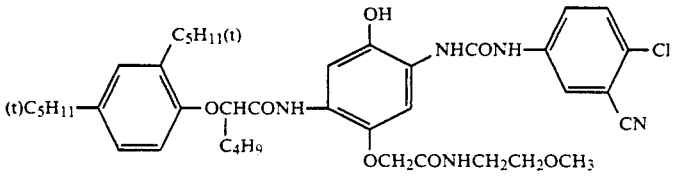
CU-18
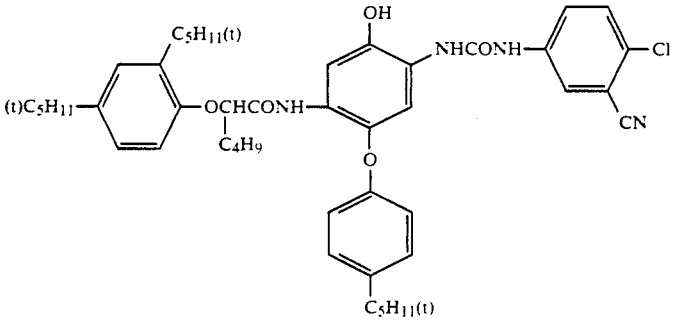
CU-19
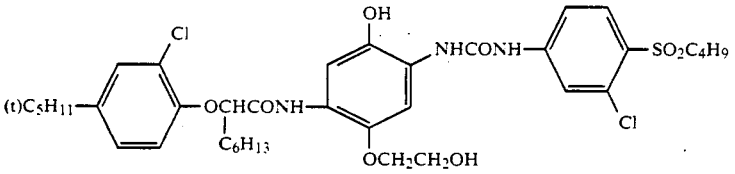
CU-20
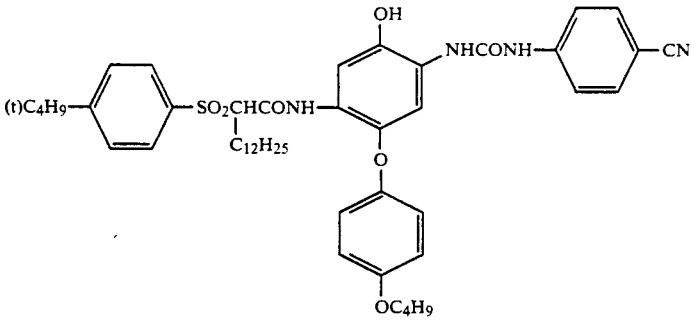
CU-21
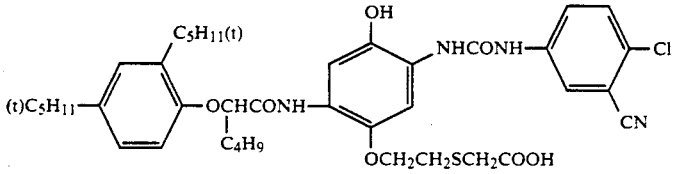

-continued
CU-22
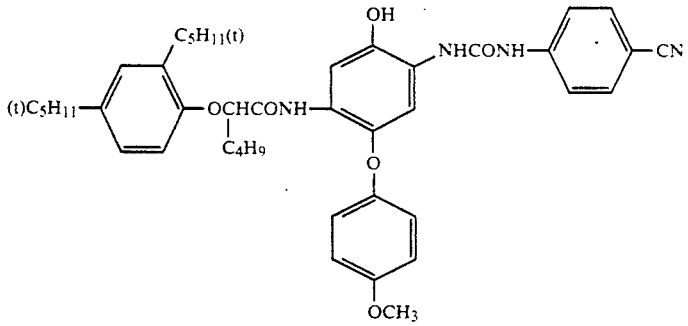
CU-23
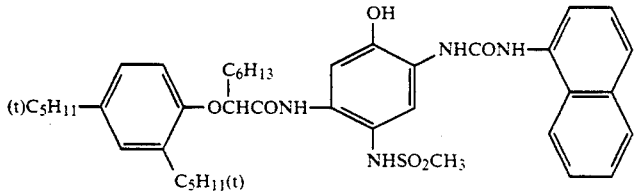
CU-24
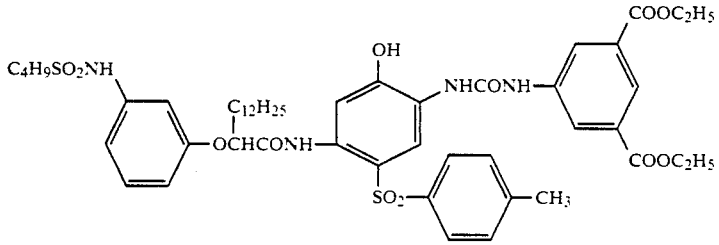
CU-25
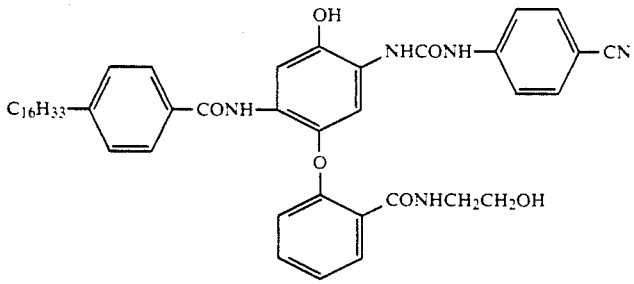
CU-26
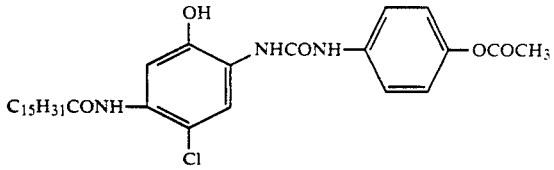
CU-27
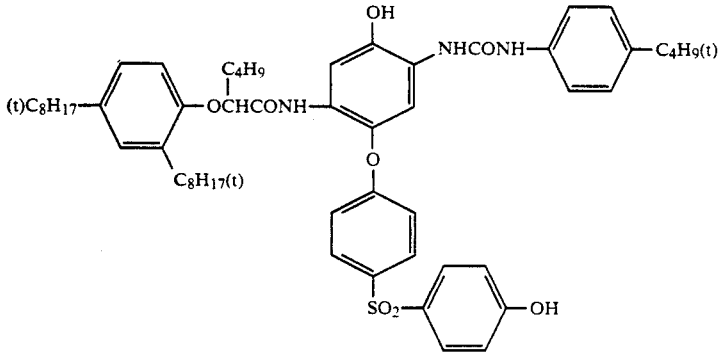

-continued
CU-28
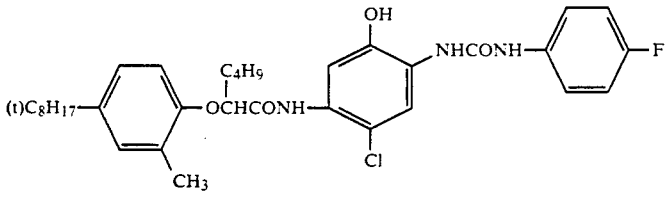
CU-29
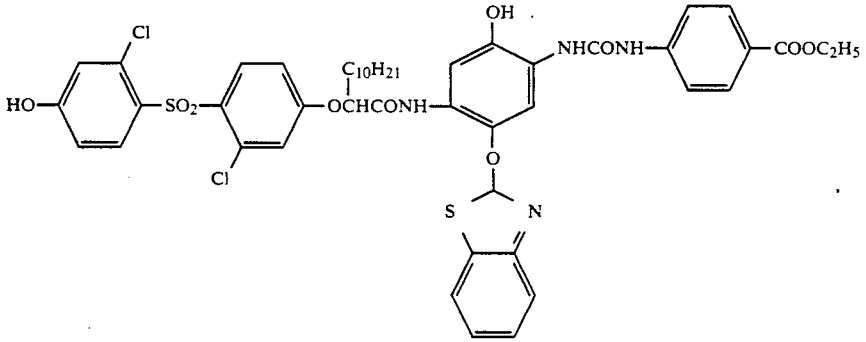
CU-30
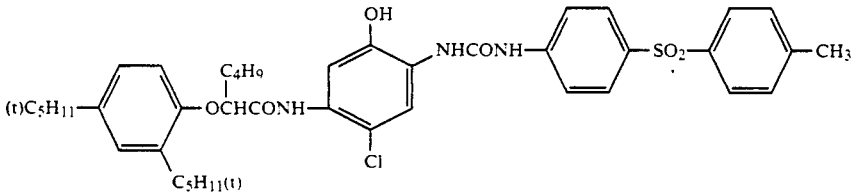
CU-31
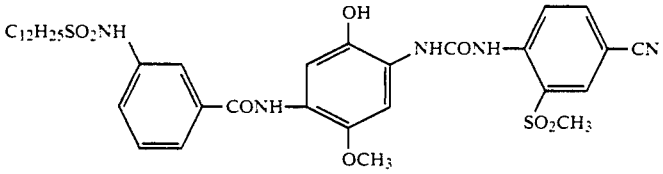
CU-32
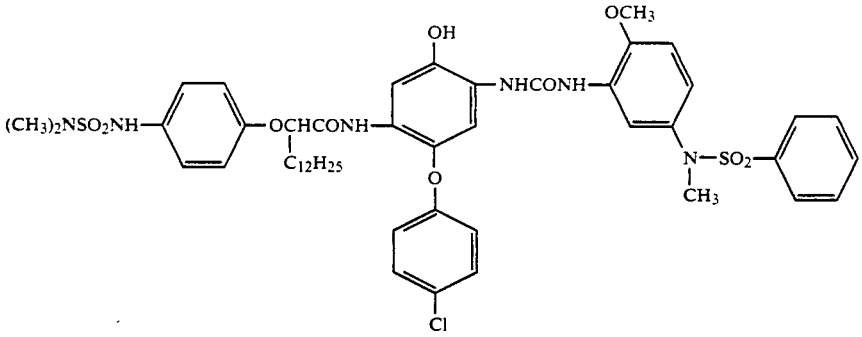
CU-33
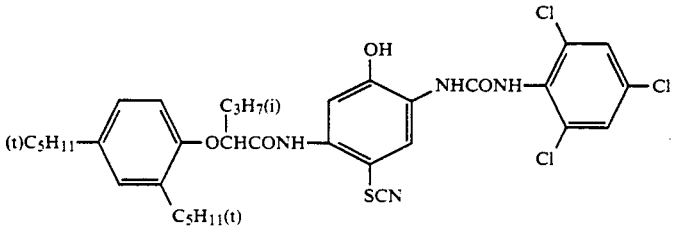

-continued
CU-34
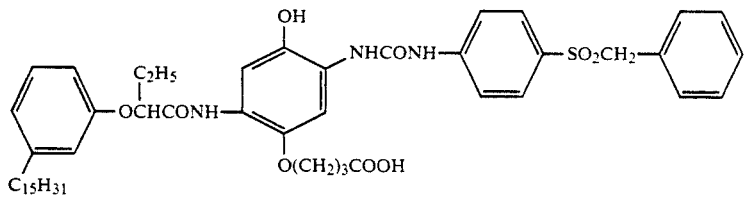
CU-35
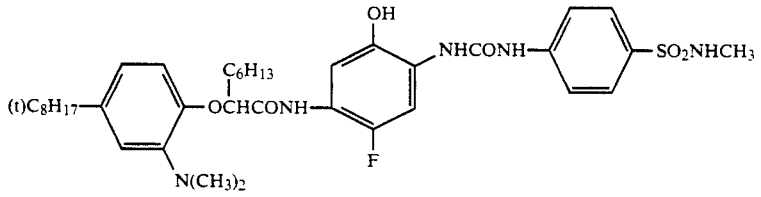
CU-36
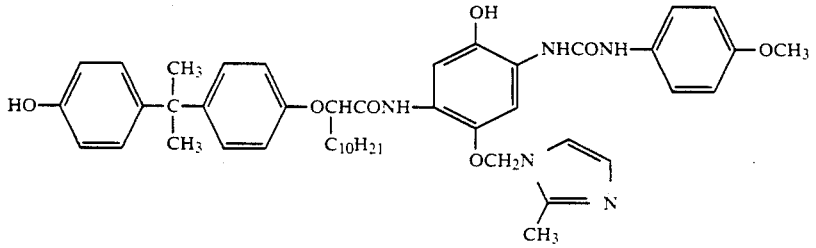
CU-37
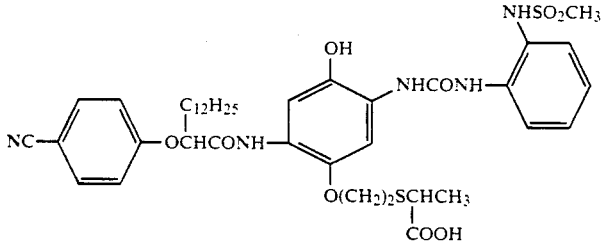
CU-38
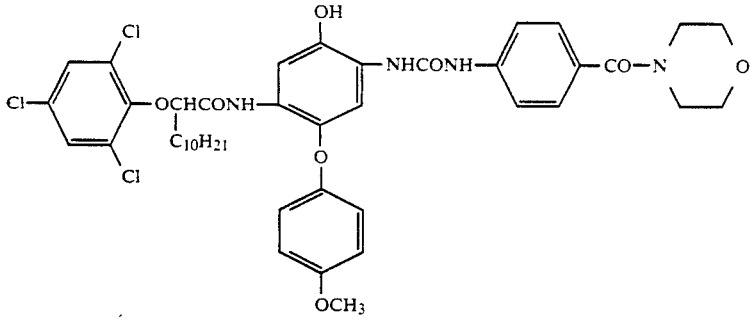
CU-39
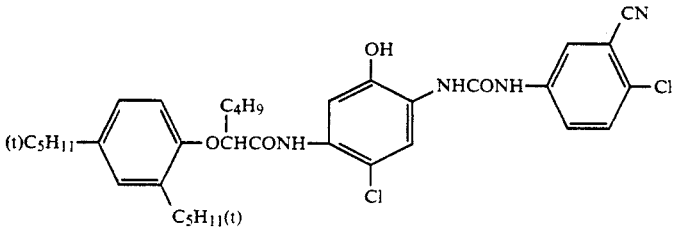

-continued

CU-40

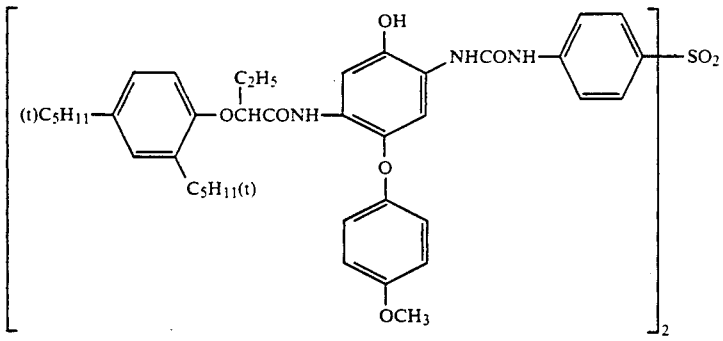

CU-41

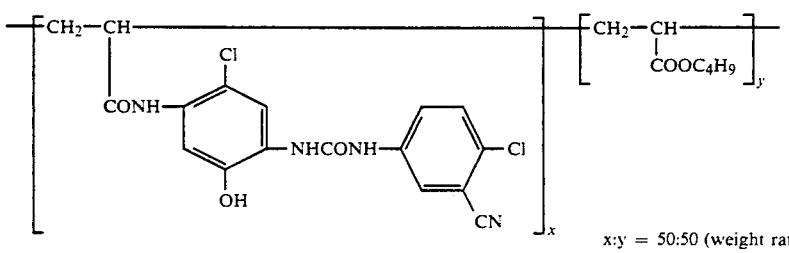

x:y = 50:50 (weight ratio)

CU-42

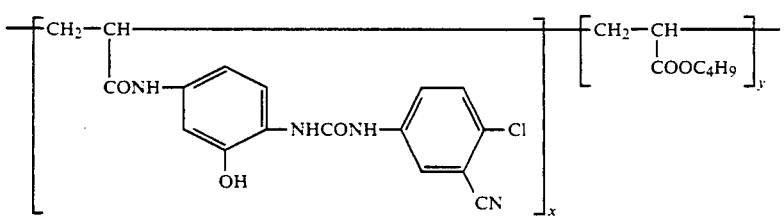

x:y = 50:50 (weight ratio)

Other specific examples of the ureidophenolic coupler are described in Japanese Patent Application (OPI) No. 65134/1981, 204543/1982, 204544/1982, 204545/1982, 33249/1983, 33253/1983, 98731/1983, 118643/1983, 179838/1983, 187928/1983, 65844/1984, 71051/1984, 86048/1984, 105644/1984, 111643/1984, 111644/1984, 131939/1984, 165058/1984, 177558/1984, 180559/1984, 198455/1984, 35731/1985, 37557/1985, 49335/1985, 49336/1985, 50533/1985, 91355/1985, 107649/1985, 107650/1985, 2757/1986, etc.

The cyan couplers described above are normally used in amounts ranging from $1.0\times10^{-3}$ to 1.0 mole, preferably from $5.0\times10^{-3}$ to $8.0\times10^{-1}$ moles, per mole of silver halide.

The couplers to be used in the present invention can be incorporated in the light-sensitive material by various methods depending upon the physical properties (e.g., solubility) of the couplers; typical methods that can be employed include a water-in-oil type emulsion dispersing method which employs a water-insoluble high-boiling point organic solvent, an alkali dispersing method in which the couplers are added as alkaline solutions, a latex dispersing method, and a solid dispersing method in which the couplers are directly added as fine solid particles.

The silver halide photographic material of the present invention may incorporate a variety of additives including color fog preventing agents, image stabilizers, hardening agents, plasticizers, polymer latices, $\mu$v absorbers, formaldehyde scavengers, mordants, development accelerators, development retarders, brightening agents, matting agents, lubricants, antistats and surfactants.

The silver halide photographic material of the present invention is capable of forming image by being subjected to various color development processes as in the processing of ordinary silver halide photographic materials.

A silver halide photographic material incorporating the polymer defined herein is capable of suppressing fogging that will otherwise occur in ordinary color development. A particular advantage of this photographic material is that it is capable of appreciable reduction in the increase of fogging which will otherwise occur in rapid color development (on account of the use of an increased amount of color developing agent or processing at increased pH and temperature). In addition, this photographic material will experience a smaller degree of desensitization and reduction in gradation than when ordinary fog restrainers are used. As a further advantage, the photographic material of the present invention will produce an image having improved sharpness and granularity.

The following examples are provided for the purpose of further illustrating the present invention but are in no way to be taken as limiting.

Unless otherwise noted, the amounts of sensitizing dyes and couplers added to silver halide photographic materials in the following examples are based on one mole of silver halide. Unless otherwise noted, the amounts of addition of other additives are based on one square meter. The amounts of silver halides and colloidal silver are shown in terms of silver.

EXAMPLE 1

Layers having the formulations described below were formed is superposition on a triacetyl cellulose film base to form sample No. 1

| Sample No. 1 | | |
|---|---|---|
| First layer: | Highly blue-sensitive silver halide emulsion layer<br>Monodispersed core/shell emulsion (Emulsion I) having an average grain size of 1.2 μm and being composed of AgBrI containing 6.0 mol % AgI | 1.2 g/m$^2$ |
| | Sensitizing dye V | $1.8 \times 10^{-4}$ mole per mole of silver |
| | Yellow coupler (YB-15) | 0.04 moles per mole of silver |
| | HBS-2A | 0.25 g |
| Second layer: | Protective layer<br>Gelatin layer containing polymethyl methacrylate particles (1.5 μm in diameter) and formaldehyde scavenger (HS-1) | |

Besides the compositions mentioned above, a gelatin hardener (H-1) or (H-2) and a surfactant were incorporated in the individual layers.

Sample Nos. 2–12 were prepared in the same manner as described above except that the emulsion and the yellow coupler were replaced by those shown in Table 1 below and that polyvinylpyrrolidone (PVP) or a restrainer (Z-I or Z-II) was added.

Emulsion II: monodispersed homogeneous emulsion having an average grain size of 1.2 μm and being composed of AgBrI containing 4.0 mol % AgI

Y-1

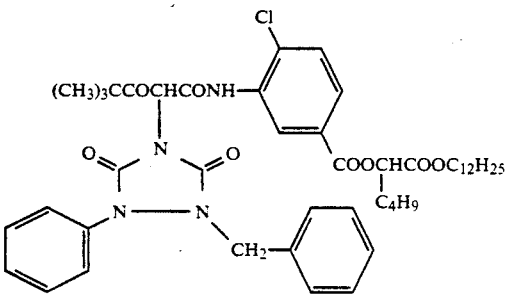

-continued

Z-1

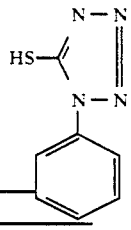

Z-2

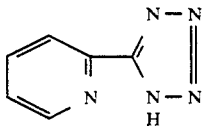

TABLE 1

| Sample No. | Emulsion | Yellow coupler | Polymer or restrainer: Compound | MW | Amount added (g/mol Ag) | Remarks |
|---|---|---|---|---|---|---|
| 1 | I | YB-15 | — | — | — | Comparison |
| 2 | " | " | PVP | 360,000 | 0.2 | Comparison |
| 3 | " | " | " | 160,000 | " | Comparison |
| 4 | " | " | " | 45,000 | " | Comparison |
| 5 | " | " | " | 25,000 | " | the invention |
| 6 | " | " | " | 9,000 | " | the invention |
| 7 | II | " | " | 360,000 | " | Comparison |
| 8 | " | " | " | 9,000 | " | the invention |
| 9 | I | Y-1 | " | 360,000 | " | Comparison |
| 10 | " | " | " | 9,000 | " | the invention |
| 11 | " | YB-15 | Z-I | | 0.01 | Comparison |
| 12 | " | " | Z-II | | 0.1 | Comparison |

Sample Nos 1–12 thus prepared were exposed to white light through an optical wedge and subsequently processed according to scheme (A).

| Processing scheme (A)<br>Processing steps (38° C.) | |
|---|---|
| Color development | 3 min and 15 seconds |
| Bleaching | 6 min and 30 seconds |
| Rinsing | 3 min and 15 seconds |
| Fixing | 6 min and 30 seconds |
| Rinsing | 3 min and 15 seconds |
| Stabilizing | 1 min and 30 seconds |
| Drying | |

The processing solutions employed in this processing had the following formulations.

| Color developer | |
|---|---|
| 4-Amino-3-methyl-N-ethyl-N-(β-hydroxyethyl)aniline sulfate | 4.75 g |

-continued

| | |
|---|---|
| Anhydrous sodium sulfite | 4.25 g |
| Hydroxylamine ½ sulfate | 2.0 g |
| Anhydrous potassium carbonate | 37.5 g |
| Sodium bromide | 1.3 g |
| Nitrilotriacetic acid trisodium salt (monohydrate) | 2.5 g |
| Potassium hydroxide | 1.0 g |
| Water | to make 1,000 ml |
| pH | 10.1 |
| Bleaching solution | |
| Ethylenediaminetetraacetic acid iron ammonium salt | 100.0 g |
| Ethylenediaminetetraacetic acid diammonium salt | 10.0 g |
| Ammonium bromide | 150.0 g |
| Glacial acetic acid | 10.0 ml |
| Water | to make 1,000 ml |
| pH adjusted to 6.0 with aqueous ammonia | |
| Fixing solution | |
| Ammonium thiosulfate | 175.0 g |
| Anhydrous sodium sulfite | 8.5 g |
| Sodium metasulfite | 2.3 g |
| Water | to make 1,000 ml |
| pH adjusted to 6.0 with acetic acid | |
| Stabilizing solution | |
| Formaldehyde (37% aq. sol.) | 1.5 ml |
| Konidax (Konica Corp.) | 7.5 ml |
| Water | to make 1,000 ml |

The same samples were processed by scheme (B) which was the same as scheme (A) except that the conditions of color development and the formulation of color developer were charged to those shown below.

| | |
|---|---|
| Processing scheme (B) | |
| Color development | 90 sec at 40° C. |
| Color developer | |
| 4-Amino-3-methyl-N-(β-hydroxyethyl)aniline sulfate | 11.1 g |
| Anhydrous sodium sulfite | 4.25 g |
| Hydroxylamine ½ sulfate | 2.0 g |
| Anhydrous potassium carbonate | 30.0 g |
| Sodium bromide | 1.3 g |
| Nitrilotriacetic acid trisodium salt (monohydrate) | 2.5 g |
| Potassium hydroxide | 1.0 g |
| Water | to make 1,000 ml |
| pH | 10.2 |

The dye images formed on the processed samples were measured under illumination with blue light. The measured values of minimum density (Dmin) and relative sensitivity (with the sensitivity of sample No. 1 being taken as 100) are shown in Table 2.

TABLE 2

| Sample No. | Scheme A $D_{min}$ | Scheme A Relative sensitivity | Scheme B $D_{min}$ | Scheme B Relative sensitivity | Remarks |
|---|---|---|---|---|---|
| 1 | 0.20 | 100 | 0.35 | 100 | comparison |
| 2 | 0.19 | 100 | 0.33 | 102 | comparison |
| 3 | 0.19 | 98 | 0.32 | 102 | comparison |
| 4 | 0.18 | 99 | 0.30 | 104 | comparison |
| 5 | 0.16 | 100 | 0.25 | 112 | the invention |
| 6 | 0.12 | 102 | 0.17 | 117 | the invention |
| 7 | 0.18 | 95 | 0.34 | 95 | comparison |
| 8 | 0.11 | 95 | 0.19 | 100 | the invention |
| 9 | 0.19 | 89 | 0.34 | 92 | comparison |
| 10 | 0.13 | 89 | 0.20 | 95 | the invention |
| 11 | 0.16 | 63 | 0.26 | 56 | comparison |
| 12 | 0.16 | 95 | 0.31 | 95 | comparison |

As the above data shows, the samples prepared in accordance with the present invention had the advantages of the absence of desensitization and low fogging. It is particularly interesting to note that these samples experienced an appreciably low degree of increase in fogging.

EXAMPLE 2

Layers having the formulations described below were formed in superposition on a triacetyl cellulose film support to form a multilayered color photographic material sample No. 21.

| Sample No. 21 (Comparison) | | |
|---|---|---|
| First layer: | Anti-halation layer (HC-1)<br>Gelatin layer containing black colloidal silver | |
| Second layer: | Intermediate layer (I.L.)<br>Gelatin layer containing an emulsified dispersion of 2,5-di-t-octylhydroquinone | |
| Third layer: | Less red-sensitive silver halide emulsion layer (RL-1)<br>Monodispersed core/shell emulsion (Emulsion III) having an average grain size (r) of 0.65 μm and being composed of AgBrI containing 7 mol % AgI | silver deposit, 1.8 g/m² |
| | Sensitizing dye I | $5.0 \times 10^{-4}$ moles per mole of silver |
| | Sensitizing dye II | $0.7 \times 10^{-4}$ moles per mole of silver |
| | Cyan coupler (CU-4) | 0.10 mole per mole of silver |
| | Colored cyan coupler (CC-1) | 0.002 moles per mole of silver |
| | DIR compound (D-1) | 0.0005 moles per mole of silver |
| | DIR compound (D-2) | 0.003 moles per mole of silver |
| | HBS-1A | 1.0 g |
| Fourth layer: | Intermediate layer<br>Gelatin layer which was the same as the second layer | |
| Fifth layer: | Highly red-sensitive silver halide emulsion layer (RH-1)<br>Monodispersed emulsion (Emulsion II) having an average grain size (r) of 1.2 μm and being composed of AgBrI containing 6 mol % AgI | silver deposit, 2.2 g/m² |

-continued

| Sample No. 21 (Comparison) | | |
|---|---|---|
| | Sensitizing dye I | $2.6 \times 10^{-4}$ moles per mole of silver |
| | Sensitizing dye II | $0.7 \times 10^{-4}$ moles per mole of silver |
| | Cyan coupler (CU-4) | 0.004 moles per mole of silver |
| | Cyan coupler (C-1) | 0.014 moles per mole of silver |
| | Colored cyan coupler (CC-1) | 0.001 mole per mole of silver |
| | DIR compound (D-2) | 0.0005 moles per mole of silver |
| | HBS-1A | 0.37 g |
| Sixth layer: | Intermediate layer (I.L.) Gelatin layer which was the same as the second layer | |
| Seventh layer: | Less green-sensitive silver halide emulsion layer (GL-1) | |
| | Emulsion III | silver deposit, 1.0 g/m$^2$ |
| | Sensitizing dye III | $2.0 \times 10^{-4}$ moles per mole of silver |
| | Sensitizing dye IV | $1.0 \times 10^{-4}$ mole per mole of silver |
| | Magenta coupler (M-4) | 0.090 moles per mole of silver |
| | Colored magenta coupler (CM-1) | 0.007 moles per mole of silver |
| | DIR compound (D-3) | 0.002 moles per mole of silver |
| | DIR compound (D-4) | 0.003 moles per mole of silver |
| | HBS-2A | 0.90 g |
| Eighth layer: | Intermediate layer Gelatin layer which was the same as the second layer | |
| Ninth layer: | Highly green-sensitive silver halide emulsion layer (GH-1) | |
| | Emulsion I | silver deposit, 2.5 g/m$^2$ |
| | Sensitizing dye III | $1.2 \times 10^{-4}$ moles per mole of silver |
| | Sensitizing dye IV | $0.8 \times 10^{-4}$ moles per mole of silver |
| | Magenta coupler (M-4) | 0.01 mole per mole of silver |
| | Colored magenta coupler (CM-1) | 0.005 moles per mole of silver |
| | DIR compound (D-3) | 0.0002 moles per silver |
| | HBS-2A | 0.22 g |
| Tenth layer: | Yellow filter layer (YC-1) Gelatin layer containing an emulsified dispersion of yellow colloidal silver and 2,5-di-t-octylhydroquinone | |
| Eleventh layer: | Less blue-sensitive silver halide emulsion layer (BL-1) | |
| | Emulsion III | silver deposit, 0.5 g/m$^2$ |
| | Sensitizing dye V | $1.3 \times 10^{-4}$ moles per mole of silver |
| | Yellow coupler (YB-15) | 0.35 moles per mole of silver |
| | HBS-2A | 0.25 g |
| Twelfth layer: | Highly blue-sensitive silver halide emulsion layer (BH-1) Same as the first layer used in Example 1 | |
| Thirteenth layer: | First protective layer (Pro-1) Gelatin layer containing silver iodobromide (1 mol % AgI; average grain size, 0.07 μm; silver deposit, 0.4 g/m$^2$), as well as uv absorbers UV-1 and UV-2 | |
| Fourteenth layer: | Second protective layer (Pro-2) Same as the second layer (protective layer) used in Example 1 | |

Besides the compositions described above, a gelatin hardener (H-1) or (H-2) and a surfactant were incorporated in the individual layers. Provided that the film thickness of each layer is 2.0 μm for the first layer, 1.0 μm for the second layer, 3.2 μm for the third layer, 1.0 μm for the fourth layer, 1.6 μm for the fifth layer, 1.0 μm for the sixth layer, 2.9 μm for the seventh layer, 1.0

μm for the eighth layer, 1.5 μm for the ninth layer, 1.2 μm for the tenth layer, 2.5 μm for the eleventh layer, 1.5 μm for the twelfth layer, 1.1 μm for the thirteenth layer and 0.7 μm for the fourteenth layer, respectively, the total thickness of the photographic constituent layers being 22.2 μm.

Samples Nos. 22–26 were prepared in the same way as described above except that polyvinylpyrrolidone (for its molecular weight, see Table 3) was incorporated in an amount of 0.5 g per mole of silver in selected emulsion layers (layers 3, 5, 7, 9, 11 and 12). Sample Nos. 27–30 were prepared in the same way except that the magenta and cyan couplers in sample Nos. 22–26 were replaced by those shown in Table 3.

TABLE 3

| Sample No. | Molecular weight of polyvinyl pyrrolidone | Coupler 3rd layer | 5th layer | 7th layer | 9th layer | Remarks |
|---|---|---|---|---|---|---|
| 21 | absent | CU-4 | CU-4/ C-1 | M-4 | M-4 | comparison |
| 22 | 460.000 | CU-4 | CU-4/ C-1 | M-4 | M-4 | comparison |
| 23 | 160.000 | CU-4 | CU-4/ C-1 | M-4 | M-4 | comparison |
| 24 | 45.000 | CU-4 | CU-4/ C-1 | M-4 | M-4 | comparison |
| 25 | 25.000 | CU-4 | CU-4/ C-1 | M-4 | M-4 | the invention |
| 26 | 9.000 | CU-4 | CU-4/ C-1 | M-4 | M-4 | the invention |
| 27 | 460.000 | CN-20 | CN-20/ C-1 | M-4 | M-4 | comparison |
| 28 | 9.000 | CN-20 | CN-20/ C-1 | M-4 | M-4 | the invention |
| 29 | 460.000 | CN-20 | CN-20/ C-1 | MC-1 | MC-1 | comparison |
| 30 | 9.000 | CN-20 | CN-20/ C-1 | MC-1 | MC-1 | the invention |

Sample Nos. 21–30 thus prepared were exposed to white light through an optical wedge and subsequently processed in accordance with scheme A, B or rapid scheme C which was the same as B except that the time of bleaching step was shortened from 6 minutes and 30 seconds to 3 minutes and 15 seconds. The processed samples were subjected to density measurements under illumination with blue, green or red light and the minimum density (Dmin) and relative sensitivity (with the value for sample No. 21 being taken as 100) were determined. The results are shown in Table 4.

The following compounds were incorporated in the individual layers of the samples.

Sensitizing dye I: Anhydro-5,5'-dichloro-9-ethyl-3,3'-di-(3-sulfopropyl)thiacarbocyanine hydroxide Sensitizing dye II: Anhydro-9-ethyl-3,3-di-(3-sulfopropyl)-4,5,4',5'-dibenzothiacarbocyanine hydroxide Sensitizing dye III: Anhydro-5,5'-diphenyl-9-ethyl-3,3'-di-(3-sulfopropyl)oxycarbocyanine hydroxide Sensitizing dye IV: Anhydro-9-ethyl-3,3'-di-(3-sulfopropyl)-5,6,5',6'-dibenzoxacarbocyanine hydroxide Sensitizing dye V: Anhydro-3,3'-di-(3-sulfopropyl)-4,5-benzo-5'-methoxythiacyanine anhydroxide

C-1

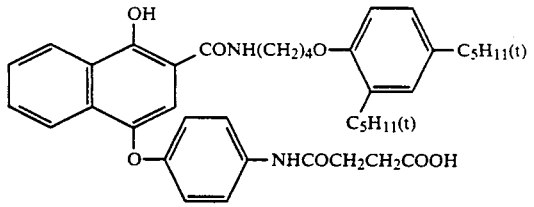

CC-1

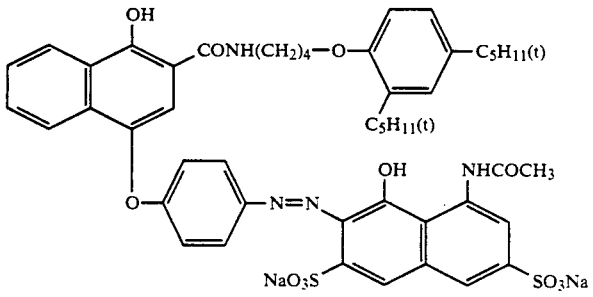

-continued
D-1
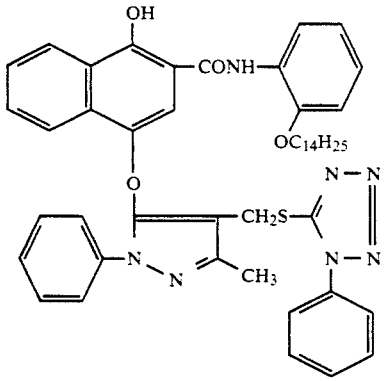
D-2
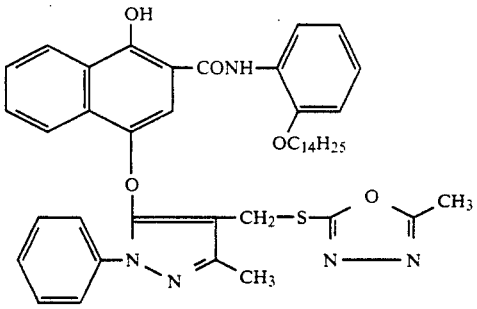
D-3
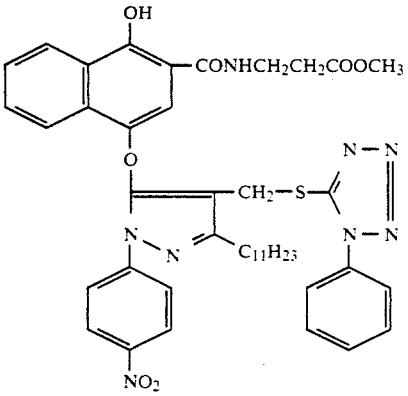
D-4
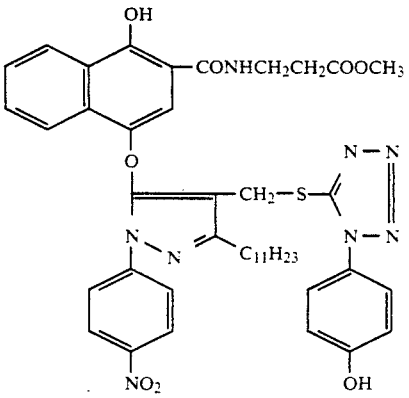
D-5
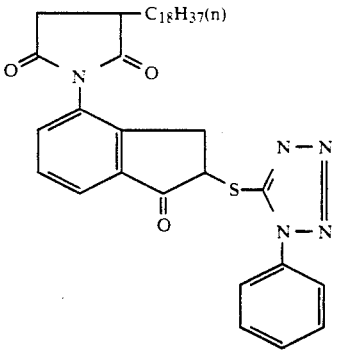
MC-1
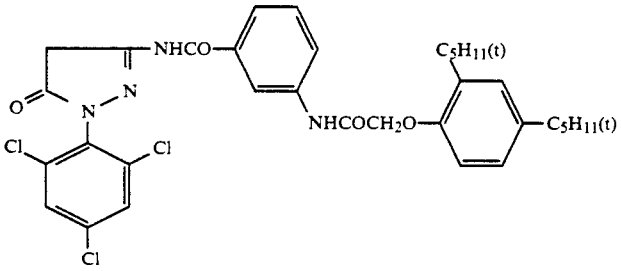

-continued

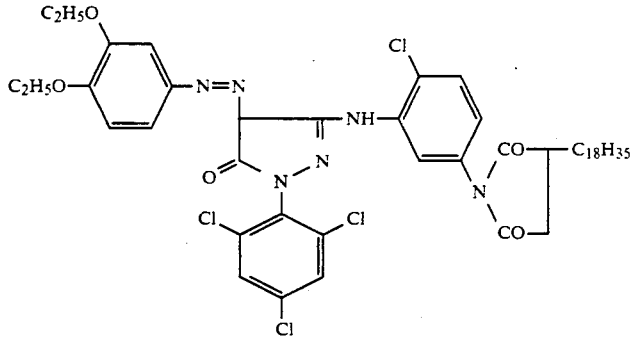

CM-1

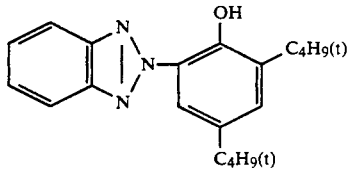

UV-1

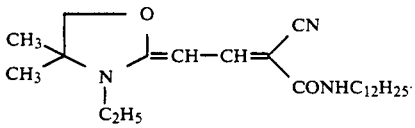

UV-2

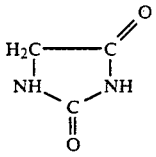

HS-1

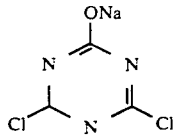

H-1

H-2

Dioctyl phthalate (DOP) HBS-1A $[(CH_2{=}CHSO_2CH_2)_3CCH_2SO_2CH_2CH_2]_2NCH_2CH_2SO_3K$ Tricresyl phosphate (TCP) HBS-2A

TABLE 4

| Sample No. | Scheme A $D_{min}$ B | G | R | Relative sensitivity B | G | R | Scheme B $D_{min}$ B | G | R | Relative sensitivity B | G | R | Remarks |
|---|---|---|---|---|---|---|---|---|---|---|---|---|---|
| 21 | 0.80 | 0.65 | 0.40 | 100 | 100 | 100 | 0.95 | 0.75 | 0.50 | 100 | 100 | 100 | comparison |
| 22 | 0.80 | 0.64 | 0.39 | 100 | 100 | 100 | 0.94 | 0.75 | 0.50 | 98 | 100 | 98 | comparison |
| 23 | 0.79 | 0.65 | 0.39 | 98 | 100 | 98 | 0.92 | 0.74 | 0.49 | 98 | 98 | 100 | comparison |
| 24 | 0.78 | 0.64 | 0.38 | 98 | 99 | 99 | 0.90 | 0.73 | 0.48 | 99 | 98 | 100 | comparison |
| 25 | 0.70 | 0.62 | 0.35 | 98 | 98 | 100 | 0.78 | 0.69 | 0.40 | 107 | 100 | 102 | the invention |
| 26 | 0.65 | 0.60 | 0.31 | 102 | 100 | 98 | 0.71 | 0.66 | 0.35 | 112 | 105 | 105 | the invention |
| 27 | 0.80 | 0.65 | 0.38 | 100 | 100 | 105 | 0.94 | 0.74 | 0.47 | 100 | 98 | 102 | comparison |
| 28 | 0.66 | 0.59 | 0.29 | 102 | 102 | 107 | 0.70 | 0.65 | 0.33 | 115 | 105 | 112 | the invention |
| 29 | 0.80 | 0.64 | 0.39 | 100 | 95 | 107 | 0.96 | 0.74 | 0.49 | 100 | 95 | 102 | comparison |
| 30 | 0.66 | 0.61 | 0.30 | 100 | 95 | 110 | 0.72 | 0.68 | 0.34 | 112 | 100 | 115 | the invention |

None of the samples prepared in accordance with the present invention and which were processed by scheme C suffered a decrease in the density of cyan color as compared with the case where they were processed by scheme B. It is therefore clear that these samples of the present invention are highly adapted for rapid processing which is realized by, for example shortening of the bleaching time.

EXAMPLE 3

Layers having the formulations shown below were formed in superposition on a triacetyl cellulose film support to form color photographic material sample No. 31.

| Sample No. 31 (comparison) | | |
|---|---|---|
| First layer: | Anti-halation layer (HC-1)<br>Gelatin layer containing black colloidal silver (film thickness, 1.5 μm) | |
| Second layer: | Intermediate layer (I.L.)<br>Gelatin layer containing an emulsified dispersion of 2,5-di-t-octylhydroquinone (film thickness, 1.0 μm) | |
| Third layer: | Less red-sensitive silver halide emulsion layer (RL-1) (film thickness, 3.0 μm)<br>Monodispersed emulsion (Emulsion I) having an average grain size (r) of 0.42 μm and being | silver deposit, 1.8 g/m$^2$ |

-continued

| Sample No. 31 (comparison) | | |
|---|---|---|
| | composed of AgBrI containing 7.2 mol % AgI | |
| | Sensitizing dye I | $5 \times 10^{-4}$ moles per mole of silver |
| | Sensitizing dye II | $0.8 \times 10^{-4}$ moles per mole of silver |
| | Cyan coupler (CU-4) | 0.085 moles per mole of silver |
| | Colored cyan coupler (CC-1) | 0.005 moles per mole of silver |
| | DIR compound (D-5) | 0.0015 moles per mole of silver |
| Fourth layer: | Highly red-sensitive silver halide emulsion layer (RH-1) (film thickness, 1.5 μm) Monodispersed emulsion (Emulsion II) having an average grain size (r) of 0.75 μm and being composed of AgBrI containing 7.2 mol % AgI | silver deposit, 1.3 g/m$^2$ |
| | Sensitizing dye I | $2.5 \times 10^{-4}$ moles per mole of silver |
| | Sensitizing dye II | $0.8 \times 10^{-4}$ moles per mole of silver |
| | Cyan coupler (C-1) | 0.02 moles per mole of silver |
| | Colored cyan coupler (CC-1) | 0.0015 moles per mole of silver |
| Fifth layer: | Intermediate layer (I.L.) Gelatin layer which was the same as the second layer (film thickness, 1.5 μm) | |
| Sixth layer: | Less green-sensitive silver halide emulsion layer (GL-1) (film thickness, 3.0 μm) | |
| | Emulsion I | silver deposit, 1.8 g/m$^2$ |
| | Sensitizing dye III | $2.0 \times 10^{-4}$ moles per mole of silver |
| | Sensitizing dye IV | $1.0 \times 10^{-4}$ mole per mole of silver |
| | Magenta coupler (M-4) | 0.12 moles per mole of silver |
| | Colored magenta coupler (CM-1) | 0.004 moles per mole of silver |
| | DIR compound (D-5) | 0.002 moles per mole of silver |
| Seventh layer: | Highly green-sensitive silver halide emulsion layer (GH-1) (film thickness, 2.5 μm) | |
| | Emulsion II | silver deposit, 1.5 g/m$^2$ |
| | Sensitizing dye III | $1.2 \times 10^{-4}$ moles per mole of silver |
| | Sensitizing dye IV | $0.8 \times 10^{-4}$ moles per mole of silver |
| | Magenta coupler (MC-1) | 0.02 moles per mole of silver |
| | Colored magenta coupler (CM-1) | 0.002 moles per mole of silver |
| Eighth layer: | Yellow filter layer (YC-1) Gelatin layer containing an emulsified dispersion of yellow colloidal silver and 2,5-di-t-octylhydroquinone (film thickness, 1.5 μm) | |
| Ninth layer: | Less blue-sensitive silver halide emulsion layer (BL-1) (film thickness, 3.0 μm) Monodispersed emulsion (Emulsion III) haing an average grain size of 0.48 μm and being composed of AgBrI containing 6.0 mol % AgI | silver deposit, 0.9 g/m$^2$ |
| | Sensitizing dye V | $1.3 \times 10^{-4}$ moles per mole of silver |
| | Yellow coupler (Y-1) | 0.34 moles per mole of silver |
| Tenth layer: | Highly blue-sensitive silver halide emulsion layer (BH-1) (film thickness, 2.0 μm) Monodispersed emulsion (Emulsion IV) having an average grain size of 0.9 μm and being composed of AgBrI containing 7.2 mol % AgI | silver deposit, 0.60 g/m$^2$ |
| | Sensitizing dye V | $1.0 \times 10^{-4}$ moles per mole of silver |
| | Yellow coupler (Y-1) | 0.16 moles per mole of silver |
| | DIR compound (D-5) | 0.0015 moles per mole of silver |
| Eleventh layer: | First protective layer (Pro-1) Gelatin layer containing uv absorbers, UV-1 and UV-2 (film thickness, 1.0 μm) | |

-continued

| Sample No. 31 (comparison) | |
|---|---|
| Twelfth layer: | Second protective layer (Pro-2)<br>Gelatin layer containing AgBrI (2 mol % AgI; average grain size, 0.07 μm) for a silver deposit of 0.5 g/m$^2$ and polymethyl methacrylate particles (diameter, 1.5 μm) (film thickness, 0.5 μm) |

Besides the compositions mentioned above, a gelatin hardener (H-1) or (H-2) and a surfactant were incorporated in the individual layers. The compounds incorporated in the layers of sample No. 31 were the same as those employed in Example 2.

Additional sample Nos. 32–41 were prepared in the same way as described above except that the dry thicknesses of selected layers were changed as shown in Table 5 and that polymers within the scope of the present invention were incorporated in the amounts shown in Table 5. The compositions of the individual layers in sample Nos. 32–41 were the same as those in sample No. 31 except that polymers within the scope of the present invention were incorporated in the 10th layer. The film thickness of each layer was adjusted by changing the coating weight of gelatin. The layers not mentioned in Table 5 had the same thicknesses as those employed in sample Nos. 31.

Sample Nos. 31–41 thus prepared were exposed to white light through an optical wedge and subsequently processed as in Example according to scheme A or B.

The minimum density (Dmin) of the image produced in each sample was measured after processing by both schemes and the difference was determined. The results are shown in Table 5.

The samples processed by scheme A were subjected to MTF (sharpness) and RMS granularity measurements and the results are shown in Table 5.

Sharpness measurement was conducted in the following way: rectangular wave patterns were exposed onto a sample film and the exposed film was then measured for a density profile with a Sakura Microdensitometer Model PDM-5 (Type AR, Konica Corp.) using a slit that measured 300 μm long and 2 μm wide; the resolving power of the sample film was expressed as the percentage of input modulation to determine its MTF (modulation transfer function); the results were shown as relative values of MTF at a spatial frequency of 30 lines per millimeter (with the value for sample No. 31 being taken as 100).

RMS granularity is 1000 times the standard deviation of density fluctuations which occurred when a sample having a density of Dmin+0.7 was traced with a microdensitometer having a scanning aperture's area of 250 μm$^2$.

TABLE 5

| Sample No. | Dry film thickness (μm) 3rd | 4th | 6th | 7th | 9th | 10th | total | Polymer of the invention Type | M.W. | Amount (g/mol Ag) |
|---|---|---|---|---|---|---|---|---|---|---|
| 31 | 3.0 | 1.5 | 3.0 | 2.5 | 3.0 | 2.0 | 22.0 | — | — | — |
| 32 | 2.0 | 1.0 | 2.0 | 1.5 | 2.5 | 1.0 | 17.0 | — | — | — |
| 33 | 2.0 | 1.0 | 2.0 | 1.5 | 2.5 | 1.0 | 17.0 | (1) | 360000 | 0.5 |
| 34 | 2.0 | 1.0 | 2.0 | 1.5 | 2.5 | 1.0 | 17.0 | (1) | 160000 | 0.5 |
| 35 | 2.0 | 1.0 | 2.0 | 1.5 | 2.5 | 1.0 | 17.0 | (1) | 45000 | 0.5 |
| 36 | 2.0 | 1.0 | 2.0 | 1.5 | 2.5 | 1.0 | 17.0 | (1) | 25000 | 0.5 |
| 37 | 2.0 | 1.0 | 2.0 | 1.5 | 2.5 | 1.0 | 17.0 | (1) | 18000 | 0.5 |
| 38 | 2.0 | 1.0 | 2.0 | 1.5 | 2.5 | 1.0 | 17.0 | (1) | 9000 | 0.5 |
| 39 | 2.0 | 1.0 | 2.0 | 1.5 | 2.5 | 1.0 | 17.0 | (1) | 9000 | 0.05 |
| 40 | 2.0 | 1.0 | 2.0 | 1.5 | 2.5 | 1.0 | 17.0 | (2) | 13000 | 0.25 |
| 41 | 2.0 | 1.0 | 2.0 | 1.5 | 2.5 | 1.0 | 17.0 | (3) | 10000 | 0.25 |

| Sample No. | $\Delta D_B$ (Dmin for scheme B minus Dmin for scheme A) | MTF R | MTF G | RMS granularity G | RMS granularity R | Remarks |
|---|---|---|---|---|---|---|
| 31 | 0.10 | 100 | 100 | 34 | 30 | Outside the scope of the invention |
| 32 | 0.22 | 107 | 108 | 36 | 33 | Outside the scope of the invention |
| 33 | 0.20 | 107 | 108 | 35 | 33 | Outside the scope of the invention |
| 34 | 0.20 | 107 | 108 | 35 | 33 | Outside the scope of the invention |
| 35 | 0.19 | 107 | 108 | 34 | 33 | Outside the scope of the invention |
| 36 | 0.11 | 110 | 112 | 30 | 27 | the invention |
| 37 | 0.06 | 112 | 115 | 28 | 25 | the invention |
| 38 | 0.05 | 112 | 115 | 27 | 23 | the invention |
| 39 | 0.07 | 112 | 115 | 28 | 24 | the invention |
| 40 | 0.07 | 110 | 111 | 29 | 27 | the invention |
| 41 | 0.09 | 109 | 109 | 29 | 27 | the invention |

As Table 5 shows, the minimum density of image on each of sample Nos. 31–35 which were outside the scope of the present invention had a tendency to increase with the decreasing film thickness when they were subjected to rapid processing. Deterioration of granularity was also detectable in these samples. When polymers having molecular weights outside the range specified by the present invention were incorporated, they were not effective at all in increasing minimum density or improving granularity during rapid processing.

On the other hand, sample Nos. 36–41 prepared in accordance with the present invention experienced a small increase in minimum density during rapid processing as compared with sample Nos. 31–35 and they were characterized by improvement in both sharpness and granularity.

EXAMPLE 4

Layers having a formulations shown below were formed in superposition on a triacetyl cellulose film support to form color photographic material sample No. 51.

| Sample No. 51 (comparison) | | |
|---|---|---|
| First layer: | Anti-halation layer (HC-1) | |
| | Gelatin layer containing black colloidal silver (film thickness, 1.5 μm) | |
| Second layer: | Intermediate layer (I.L.) | |
| | Gelatin layer containing an emulsified dispersion of 2,5-di-t-octylhydroquinone (film thickness, 1.0 μm) | |
| Third layer: | Less red-sensitive silver halide emulsion layer (RL-1) (film thickness, 2.6 μm) | |
| | Monodispersed emulsion (Emulsion I) having an average grain size (r) of 0.42 μm and being composed of AgBrI containing 7.2 mol % AgI | silver deposit, 0.7 g/m$^2$ |
| | Sensitizing dye I | $5 \times 10^{-4}$ moles per mole of silver |
| | Sensitizing dye II | $0.8 \times 10^{-4}$ moles per mole of silver |
| | Cyan coupler (CU-4) | 0.17 moles per mole of silver |
| | Colored cyan coupler (CC-1) | 0.013 moles per mole of silver |
| | DIR compound (D-1) | 0.0005 moles per mole of silver |
| | DIR compound (D-2) | 0.002 moles per mole of silver |
| Fourth layer: | Highly red-sensitive silver halide emulsion layer (RH-1) (film thickness, 1.6 μm) | |
| | Monodispersed emulsion (Emulsion II) having an average grain size (r) of 0.75 μm and being composed of AgBrI containing 7.2 mol % AgI | silver deposit, 0.6 g/m$^2$ |
| | Sensitizing dye I | $2.5 \times 10^{-4}$ moles per mole of silver |
| | Sensitizing dye II | $0.8 \times 10^{-4}$ moles per mole of silver |
| | Cyan coupler (C-1) | 0.04 moles per mole of silver |
| | Colored cyan coupler (CC-1) | 0.006 moles per mole of silver |
| Fifth layer: | Intermediate layer (I.L.) | |
| | Gelatin layer which was the same as the second layer (film thickness, 1.0 μm) | |
| Sixth layer: | Less green-sensitive silver halide emulsion layer (GL-1) (film thickness, 2.3 μm) | |
| | Emulsion I | silver deposit, 0.6 g/m$^2$ |
| | Sensitizing dye III | $2.0 \times 10^{-4}$ moles per mole of silver |
| | Sensitizing dye IV | $1.0 \times 10^{-4}$ moles per mole of silver |
| | Magenta coupler (M-4) | 0.12 moles per mole of silver |
| | Colored magenta coupler (CM-1) | 0.025 moles per mole of silver |
| | DIR compound (D-3) | 0.0005 moles per mole of silver |
| | DIR compound (D-4) | 0.002 moles per mole of silver |

-continued

| Sample No. 51 (comparison) | | |
|---|---|---|
| Seventh layer: | Highly green-sensitive silver halide emulsion layer (GH-1) (film thickness, 1.3 μm) | |
| | Emulsion II | silver deposit, 0.6 g/m$^2$ |
| | Sensitizing dye III | $1.2 \times 10^{-4}$ moles per mole of silver |
| | Sensitizing dye IV | $0.8 \times 10^{-4}$ moles per mole of silver |
| | Magenta coupler (M-4) | 0.032 moles per mole of silver |
| | Colored magenta coupler (CM-1) | 0.010 moles per mole of silver |
| Eighth layer: | Yellow filter layer (YC-1) | |
| | Gelatin layer containing an emulsified dispersion of yellow colloidal silver and 2,5-di-t-octylhydroquinone (film thickness, 1.0 μm) | |
| Ninth layer: | Less blue-sensitive silver halide emulsion layer (BL-1) (film thickness, 2.2 μm) | |
| | Monodispersed emulsion (Emulsion III) having an average grain size of 0.48 μm and being composed of AgBrI containing 6.0 mol % AgI | silver deposit, 0.5 g/m$^2$ |
| | Sensitizing dye V | $1.3 \times 10^{-4}$ moles per mole of silver |
| | Yellow coupler (Y-1) | 0.35 moles per mole of silver |
| Tenth layer: | Highly blue-sensitive silver halide emulsion layer (BH-1) (film thickness, 1.4 μm) | |
| | Monodispersed emulsion (Emulsion IV) having an average grain size of 0.9 μm and being composed of AgBrI containing 7.2 mol % AgI | silver deposit, 0.50 g/m$^2$ |
| | Sensitizing dye V | $1.0 \times 10^{-4}$ moles per mole of silver |
| | Yellow coupler (Y-1) | 0.19 moles per mole of silver |
| | DIR compound (D-5) | 0.0010 moles per mole of silver |
| Eleventh layer: | First protective layer (Pro-1) | |
| | Gelatin layer containing uv absorbers, UV-1 and UV-2 (film thickness, 1.0 μm) | |
| Twelfth layer: | Second protective layer (Pro-2) | |
| | Gelatin layer containing AgBrI (2 mol % AgI; average grain size, 0.07 μm) for a silver deposit of 0.5 g/m$^2$ *and polymethyl methacrylate* particles (diameter, 1.5 μm) (film thickness, 0.5 μm) | |

Besides the compositions mentioned above, a gelatin hardener (H-1) or (H-2) and a surfactant were incorporated in the individual layers. The compounds incorporated in the layers of sample No. 51 were the same as those employed in Example 2.

Additional sample Nos. 52–57 were prepared in the same way as described above except that the dry thickness of selected layers were charged as shown in Table 6 and that polymers within the scope of the present invention were incorporated in the amounts shown in Table 6. The compositions of the individual layers in sample Nos. 52–57 were the same as those in sample No. 51 except that polymers within the scope of the present invention were incorporated in the 10th layer. The film thickness of each layer was adjusted by changing the coating weight of gelatin. The layers not mentioned in Table 6 had the same thicknesses as those employed in sample Nos. 51.

Sample Nos. 51–57 thus prepared were exposed to white light through an optical wedge and subsequently processed as in Example 1 according to scheme A or B.

The minimum density (Dmin) of the image produced in each sample was measured after processing by both schemes and the difference was determined. The results are shown in Table 6.

As in Example 3, the minimum density of image on each of Sample Nos. 51–57 which were outside the scope of the present invention had a tendency to increase with the decreasing film thickness when they were subjected to rapid processing, and, also, deterioration of granularity was detectable in these samples. With the constitution of the present invention, both the minimum density and the granularity were improved.

TABLE 6

| Sample No. | Dry film thickness (μm) 3rd | 4th | 6th | 7th | 9th | 10th | total | Polymer of the invention Type | M.W. | Amount (g/mol Ag) | $\Delta D_B$ (Dmin for scheme B minus Dmin for scheme A) | MTF R | MTF G | RMS granularity G | RMS granularity R | Remarks |
|---|---|---|---|---|---|---|---|---|---|---|---|---|---|---|---|---|
| 51 | 2.6 | 1.6 | 2.3 | 1.3 | 2.2 | 1.4 | 17.4 | — | — | — | 0.14 | 100 | 100 | 39 | 36 | Outside the scope of the invention |
| 52 | 2.6 | 1.6 | 2.3 | 1.3 | 2.2 | 1.4 | 17.4 | (1) | 360000 | 0.5 | 0.13 | 100 | 100 | 39 | 36 | Outside the scope of the invention |
| 53 | 2.6 | 1.6 | 2.3 | 1.3 | 2.2 | 1.4 | 17.4 | (1) | 9000 | 0.5 | 0.05 | 105 | 106 | 30 | 28 | the invention |
| 54 | 2.1 | 1.1 | 1.8 | 0.8 | 1.7 | 0.9 | 14.4 | (1) | 360000 | 0.5 | 0.17 | 108 | 109 | 41 | 38 | Outside the scope of the invention |
| 55 | 2.1 | 1.1 | 1.8 | 0.8 | 1.7 | 0.9 | 14.4 | (1) | 25000 | 0.5 | 0.09 | 115 | 117 | 29 | 28 | the invention |
| 56 | 2.1 | 1.1 | 1.8 | 0.8 | 1.7 | 0.9 | 14.4 | (1) | 9000 | 0.5 | 0.07 | 116 | 117 | 28 | 27 | " |
| 57 | 2.1 | 1.1 | 1.8 | 0.8 | 1.7 | 0.9 | 14.4 | (2) | 13000 | 0.5 | 0.10 | 115 | 116 | 29 | 28 | " |

What is claimed is:

1. A silver halide photographic material comprising photographic constituent layers including a blue-sensitive, green-sensitive, and red-sensitive emulsion layer, on a support, wherein;

at least one of said photographic constituent layers comprises a silver halide emulsion containing core/shell silver halide grains having a core comprising 5 to 40 mole percent silver iodide and a shell comprising at least 95 mole percent silver bromide, and a polymer including a repeating unit represented by the following Formula (I), having a weight average molecular weight of no more than 30,000, a total thickness of said photographic substituent layers being more than 18 μm on a dry basis; and said green-sensitive emulsion layer comprises a magenta coupler represented by the following Formula (M-II);

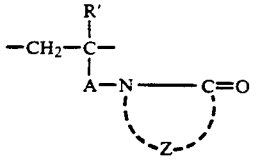

(I)

where $R^1$ is a hydrogen atom or an alkyl group; Z represents the atomic group necessary to form a lactam ring; A is a simple linkage, —CO—, —COO$(CH_2)$—$_n$, or —CONR$^2(CH_2)$—$_n$ where $R^2$ is a hydrogen atom or an alkyl group, and n is an integer of 1–6; and

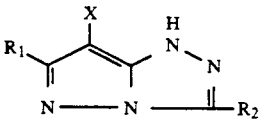

(M-II)

where X is a hydrogen atom or a group that can be eliminated upon reaction with the oxidation product of a color developing agent; and $R_1$ and $R_2$ each are a hydrogen atom or a substituent.

2. A silver halide photographic material according to claim 1 wherein $R^1$ in the general formula (I) is a hydrogen atom, A is a simple linkage or

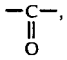

and Z is the atomic group necessary to form a 5- or 6-membered lactam.

3. A silver halide photographic material according to claim 2 wherein

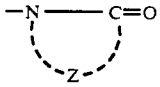

in the general formula (I) is a pyrrolidone or oxazolidone residue.

4. A silver ha photo material according to claim 3 wherein said

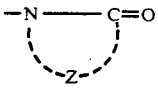

is a pyrrolidone residue.

5. A silver halide photographic material according to claim 1 wherein said polymer has a weight average molecular weight of no more than 20,000.

6. A silver halide photographic material according to claim 5 wherein said polymer has a weight average molecular weight of no more than 10,000.

7. A silver halide photographic material according to claim 1 wherein said polymer is present in an amount of 0.01–10 g per mole of silver in terms of the weight of the repeating unit represented by the general formula (I).

8. A silver halide photographic material according to claim 7 wherein said polymer is present in an amount of 0.02–5.0 g per mole of silver in terms of the weight of the repeating unit represented by the general formula (I).

9. A silver halide photographic material according to claim 8 wherein said polymer is present in an amount of 0.1–2.0 g per mole of silver in terms of the weight of the repeating unit represented by the general formula (I).

10. A silver halide photographic material according to claim 1 wherein said polymer is incorporated in a silver halide emulsion layer.

11. A silver halide photographic material according to claim 1 which contains a benzoyl type yellow coupler represented by the following general formula (YB-1):

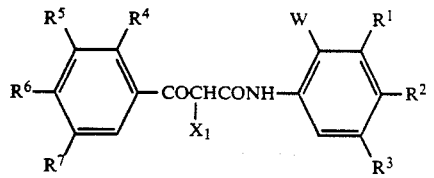

(YB-I)

where $R^1$, $R^2$ and $R^3$ which may be the same or different each represents a hydrogen atom, a halogen atom, an alkyl group, an aryl group, an alkoxy group, an acylamino group, a carbamoyl group, an alkoxycarbonyl group, a sulfonamido group or a sulfamoyl group, $R^4$, $R^5$, $R^6$ and $R^7$ which may be the same or different each represents a hydrogen atom, an alkyl group, an alkoxy group, an aryloxy group, an acylamino group or a sulfonamido group; W is a halogen atom, an alkyl group, an alkoxy group, an aryloxy group or a dialylamino group; and $X_1$ is a hydrogen atom or a group that can be eliminated.

12. A silver halide photographic material according to claim 11 wherein $X_1$ is a group represented by the following general formula (YB-II):

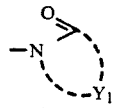

(YB-II)

where $Y_1$ denotes the non-metallic group necessary to form a 5- or 6-membered ring.

13. A silver halide photographic material according to claim 1 wherein $R_2$ is represented by the following general formula (M-X):

$$-R^1-SO_2-R^2 \quad \text{(M-X)}$$

where $R^1$ is an alkylene group and $R^2$ is an alkyl, cycloalkyl or aryl group.

14. A silver halide photographic material according to claim 1 which contains a naphtholic cyan coupler represented by the following general formula (CN):

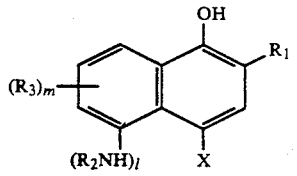

(CN)

where $R_1$ is $-CONR_4R_5$, $-NHCOR_4$, $-NHCOOR_6$, $-NHSO_2R_6$, $-NHCONR_4R_5$ or $-NHSO_2NR_4R_5$; $R_2$ is a monovalent group; $R_3$ is a substituent; X is a hydrogen atom or a group that is eliminated upon reaction with the oxidation product of an aromatic primary amino developing agent; l is 0 or 1; m is an integer of 0–3; $R_4$ and $R_5$ each represents a hydrogen atom, an aromatic group, an aliphatic group or a heterocyclic group; $R_6$ is an aromatic group, an aliphatic group or a heterocyclic group; when m is 2 or 3, $R_3$ may be the same or different and may combine with each other to form a ring; $R_4$ and $R_5$, $R_2$ and $R_3$ or $R_2$ and X may combine with each other to form a ring; when l is 0, then m is 0, $R_1$ is $-CONHR_7$ and $R_7$ is an aromatic group.

15. A silver halide photographic material according to claim 1 which contains a ureidophenolic cyan coupler represented by the following general formula (CU):

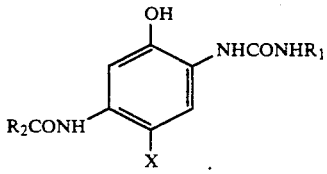

(CU)

where X is a hydrogen atom or a group that can be eliminated upon coupling with an aromatic primary amino color developing agent; $R_1$ is an aryl group or a heterocyclic group; $R_2$ is an aliphatic group or an aryl group; each of the groups denoted by $R_1$ and $R_2$ may form a dimer or higher oligomers; $R_1$ and $R_2$, taken either independently or in combination, have the shape or size necessary to impart non-diffusing property to the coupler represented by the general formula (CU) or a dye formed of said coupler.

16. A silver halide photographic material according to claim 15 wherein $R^2$ has a substituent represented by the following general formula (CU-II):

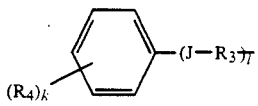

(CU-II)

where J is an oxygen or sulfur atom; k is an integer of 0–4; l is 0 or 1; when k is 2 or more, $R_4$ may be the same or different; $R_3$ is an alkylene group; and $R_4$ is a substituent.

17. A silver halide photographic material according to claim 1 wherein the total thickness of said photographic constituent layers is in the range of 5–18 μm.

18. A silver halide photographic material according to claim 17 wherein the total thickness of said photographic constituent layers is in the range of 10–16 μm.

19. A silver halide photographic material according to claim 1 wherein the thickness of layers as measured from the top surface of said photographic material to the bottom of the silver halide emulsion layer situated the closest to the support is no more than 14 μm.

20. A silver halide photographic material according to claim 19 wherein the thickness of layers as measured from the top surface of said photographic material to the bottom of a silver halide emulsion layer that has sensitivity to a different color of light than said bottommost emulsion layer and which is situated the second closest to the support is not greater than 10 μm.

21. The photographic material of claim 1 wherein said lactam ring is an oxazolidone ring.

22. The photographic material of claim 1 wherein said lactam ring is pyrrolidone ring.

* * * * *